(12) United States Patent
Yano

(10) Patent No.: US 7,949,725 B2
(45) Date of Patent: May 24, 2011

(54) SYSTEM INCLUDING A SERVER AND AT LEAST A CLIENT

(75) Inventor: Takanori Yano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 496 days.

(21) Appl. No.: 12/055,994

(22) Filed: Mar. 26, 2008

(65) Prior Publication Data

US 2008/0244002 A1 Oct. 2, 2008

(30) Foreign Application Priority Data

Mar. 26, 2007 (JP) ................................ 2007-078139

(51) Int. Cl.
*G06F 15/16* (2006.01)
(52) U.S. Cl. ...................... 709/217; 709/203; 709/219
(58) Field of Classification Search .................. 709/203, 709/217, 219
See application file for complete search history.

(56) References Cited

U.S. PATENT DOCUMENTS

| | | | | |
|---|---|---|---|---|
| 7,447,369 B2* | 11/2008 | Gormish et al. | ............... | 382/235 |
| 7,460,724 B2* | 12/2008 | Gormish | ....................... | 382/240 |
| 7,502,501 B2* | 3/2009 | Joshi | ............................. | 382/128 |
| 7,508,988 B2* | 3/2009 | Hara et al. | ..................... | 382/232 |
| 7,711,834 B2* | 5/2010 | Gormish | ....................... | 709/229 |
| 2002/0057843 A1* | 5/2002 | Matsubara | .................... | 382/240 |
| 2004/0114813 A1* | 6/2004 | Boliek et al. | ................... | 382/233 |
| 2004/0114814 A1 | 6/2004 | Boliek et al. | | |
| 2005/0058353 A1* | 3/2005 | Matsubara | .................... | 382/233 |
| 2005/0201624 A1* | 9/2005 | Hara et al. | ..................... | 382/232 |
| 2006/0170955 A1 | 8/2006 | Gormish | | |
| 2006/0245655 A1* | 11/2006 | Suino et al. | ................... | 382/232 |
| 2006/0269151 A1* | 11/2006 | Sakuyama | .................... | 382/232 |

FOREIGN PATENT DOCUMENTS

JP 2002-77631 3/2002

* cited by examiner

*Primary Examiner* — Phuoc Nguyen
(74) *Attorney, Agent, or Firm* — Oblon, Spivak, McClelland, Maier & Neustadt, L.L.P.

(57) ABSTRACT

A system includes a server and at least a client. The sever transfers a code data to the client. The client receives the code data from the server and decodes the code data. The client includes a requesting unit configured to request a code data stored in the server, a first receiving unit configured to receive the code data from the server, a decoding unit configured to decode the code data which is received from the server and a display unit configured to display an image data which is generated by the decoding unit. In addition, the server includes a second receiving unit configured to receive the request from a client, a selecting unit configured to select the code data which is requested from the client, a transferring unit configured to transfer the code data which is selected by the selecting unit, wherein the code data is a part of at least code data of JPM file.

9 Claims, 38 Drawing Sheets

FIG. 3
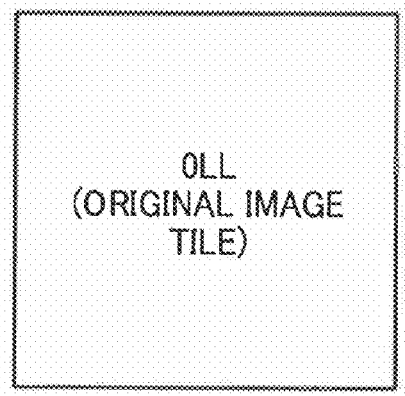
DECOMPOSITION_LEVEL1_0
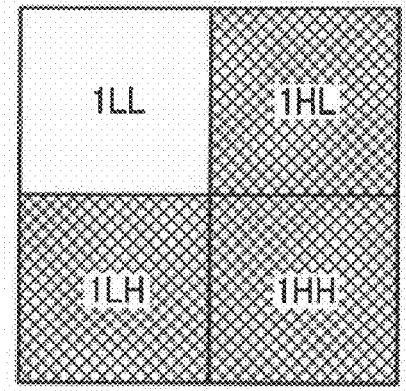
DECOMPOSITION_LEVEL1_1
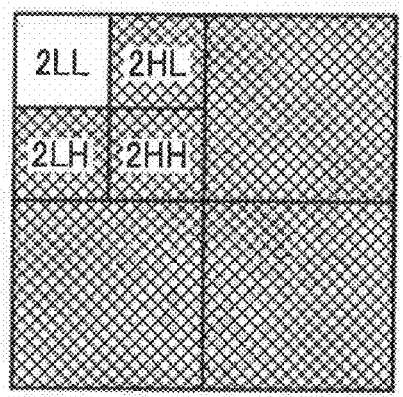
DECOMPOSITION_LEVEL1_2
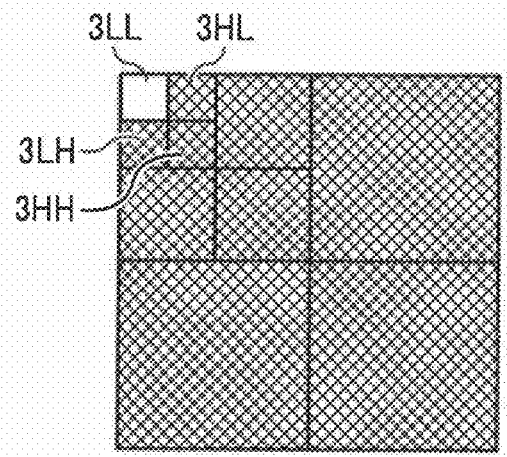
DECOMPOSITION_LEVEL1_3

FIG. 10

| SIZ | Lsiz | Rsiz | Xsiz | Ysiz | XOsiz | YOsiz | XTsiz | YTsiz | XTOsiz | YTOsiz | Csiz | Ssiz(1) | XRsiz(1) | YRsiz(1) | ... | Ssiz(n) | XRsiz(n) | YRsiz(n) |

FIG. 11

| COD | Lcod | Scod | SGcod | SPcod |

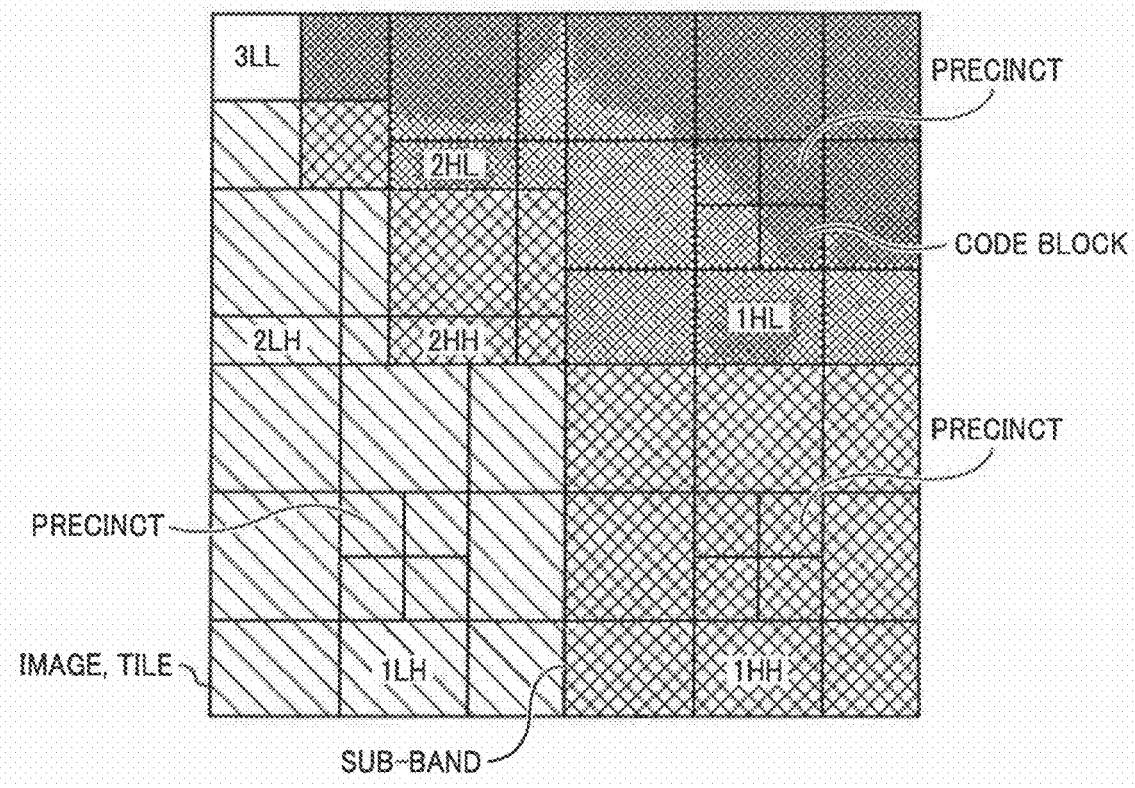

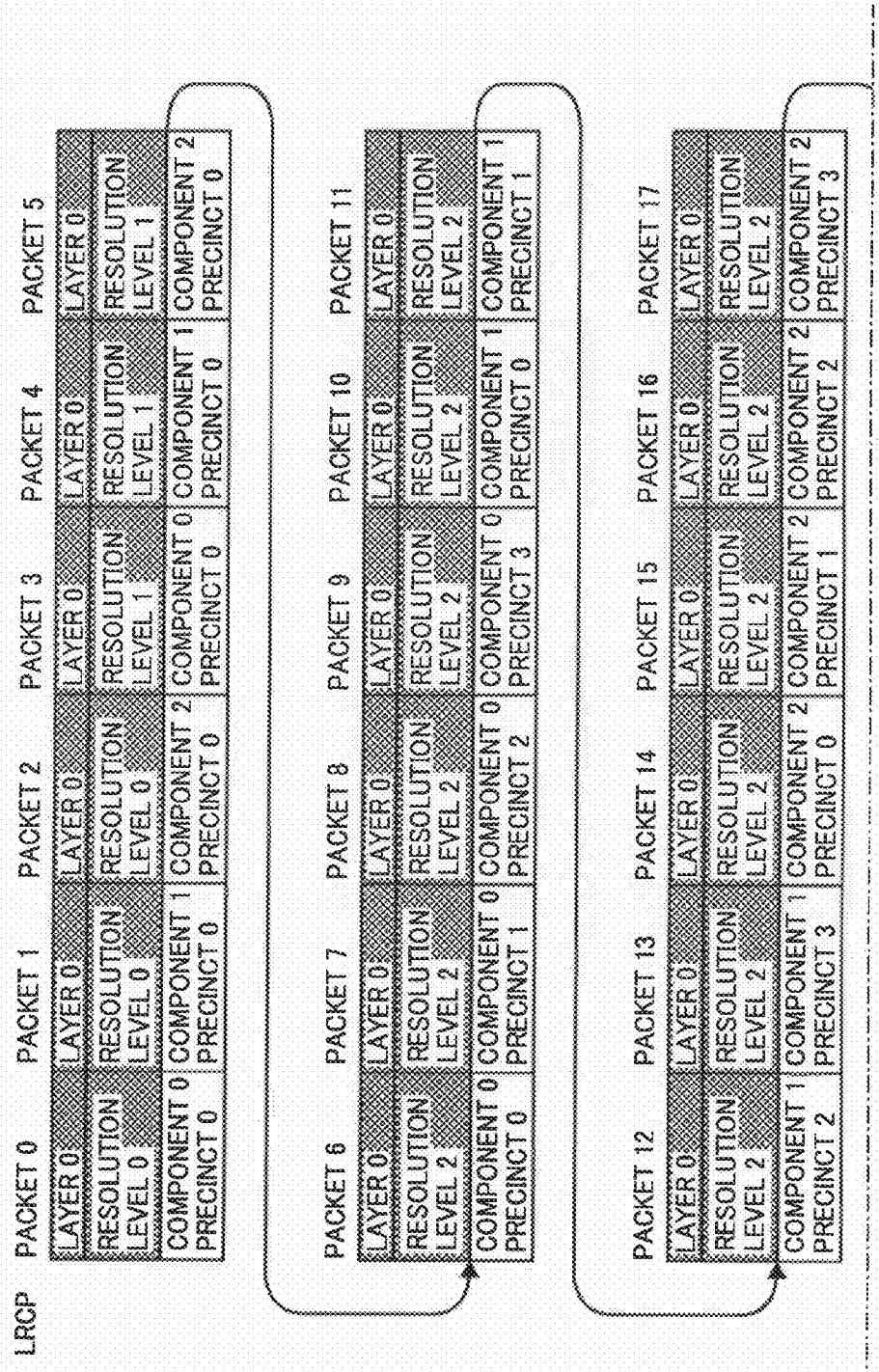

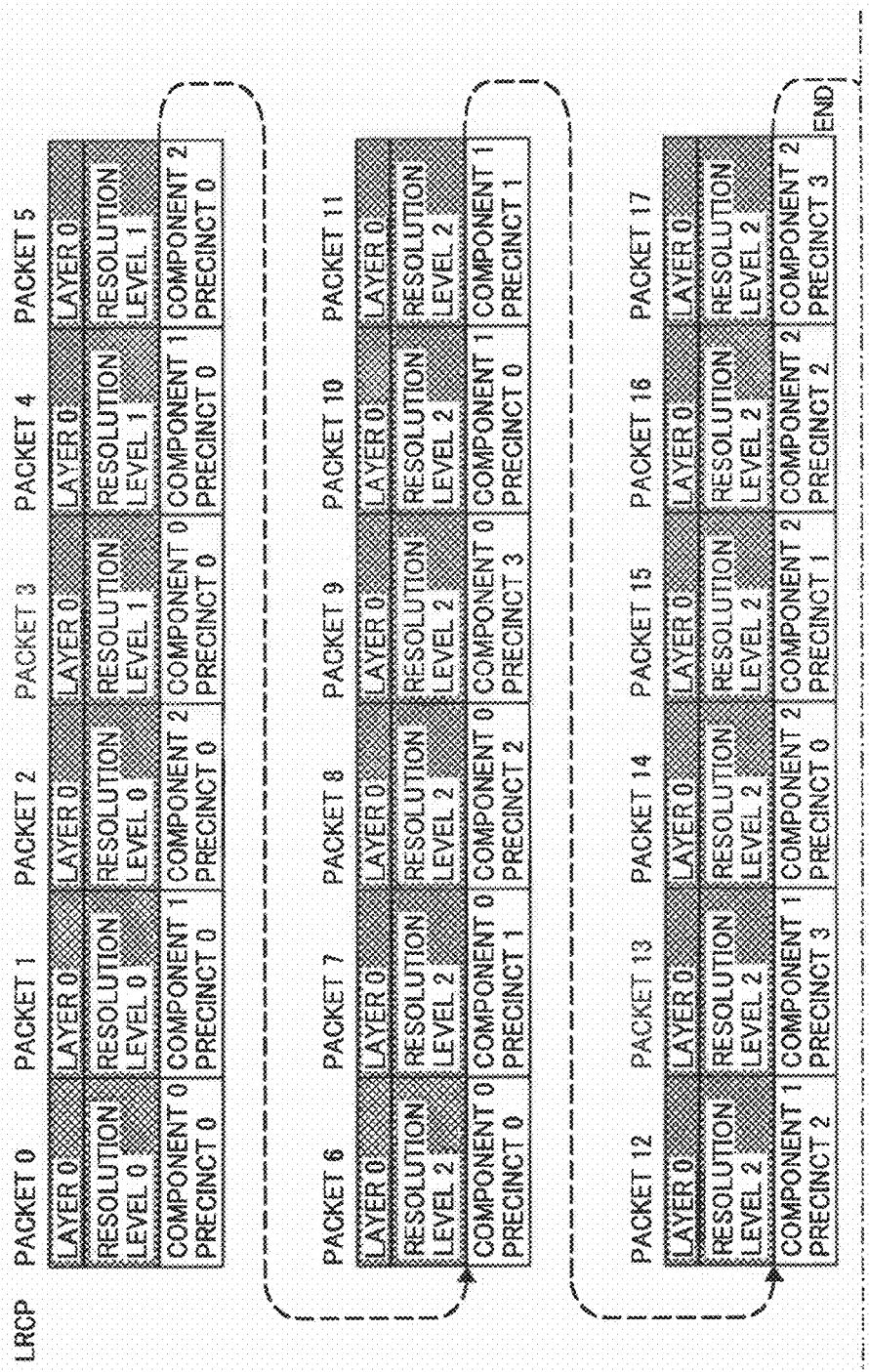

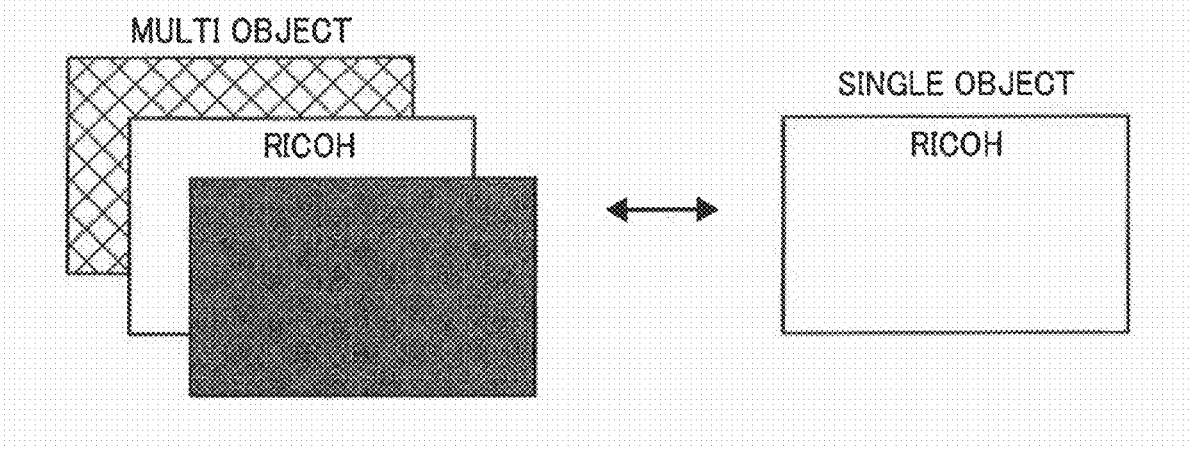

EXAMPLE OF JPM IMAGE REPRODUCTION $$PageImage_0[c][x,y] = BaseImage[c][x,y]$$

$$PageImage_m[c][x,y] = \frac{(S_m - M_m[x,y]) \times PageImage_{m-1}[c][x,y] + M_m[x,y] \times I_m[c][x,y]}{S_m}$$

$$PageImage[c][x,y] = PageImage_n[c][x,y]$$

BLENDING (IMAGE REPRODUCTION) METHOD

DECODING THE MASK

SCALING THE MASK

CLIPPING THE MASK

POSITIONING THE MASK

WINDOW CLIPPING THE MASK

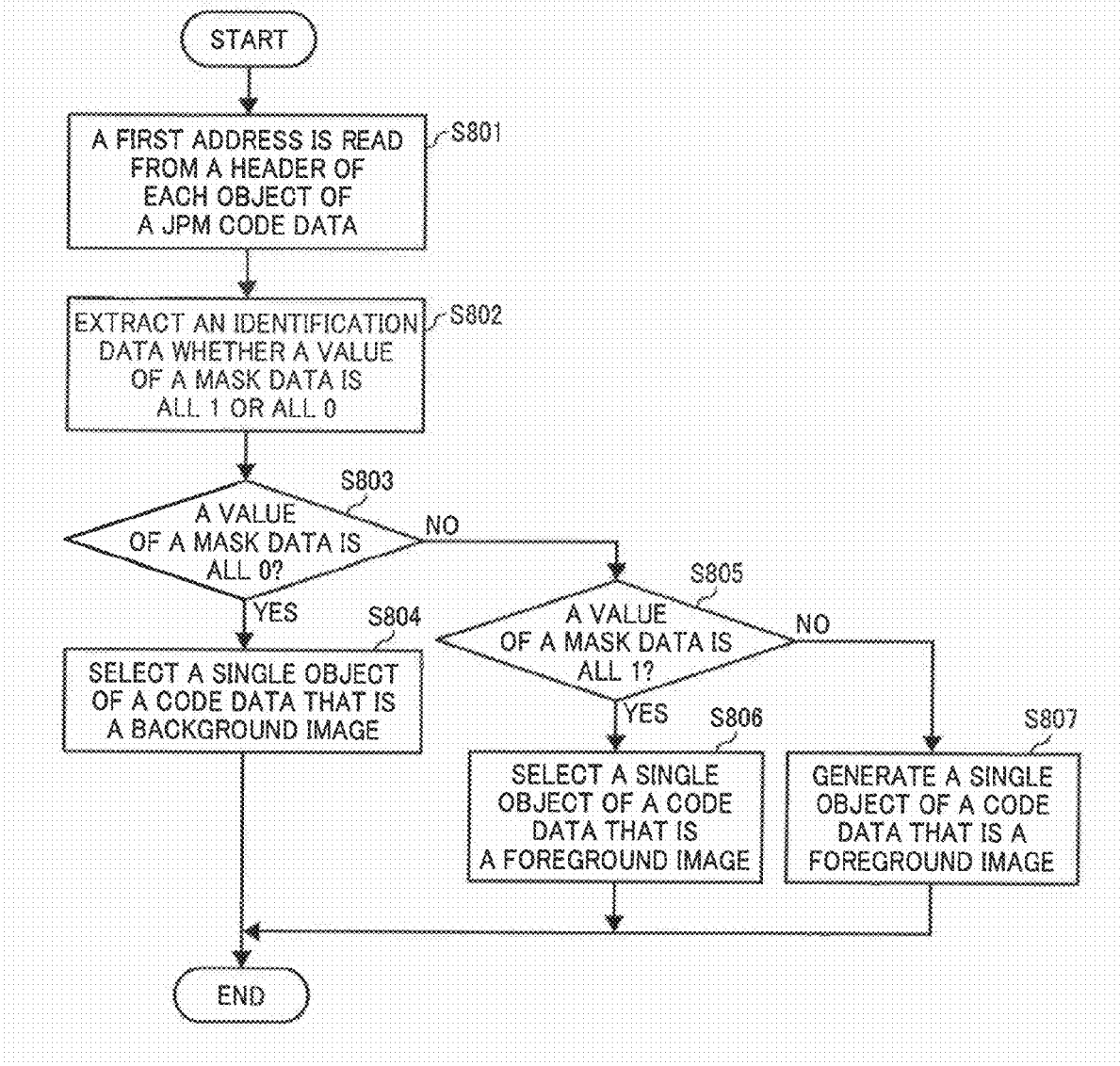

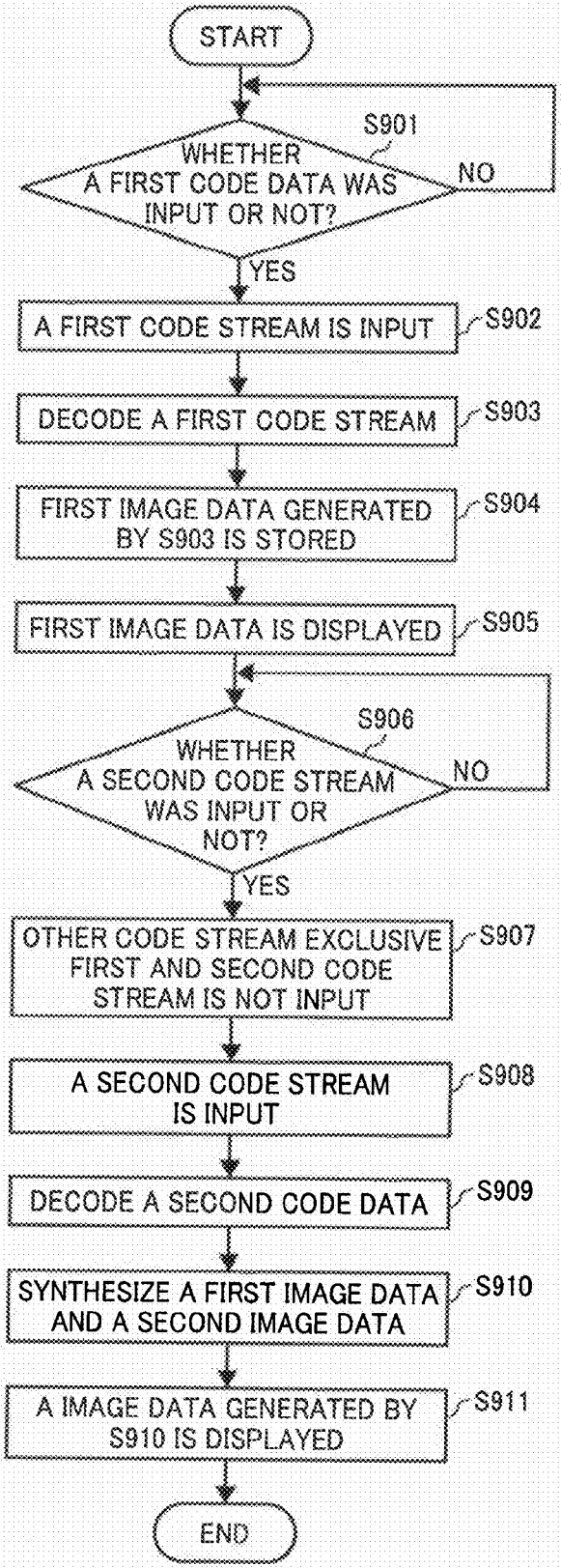

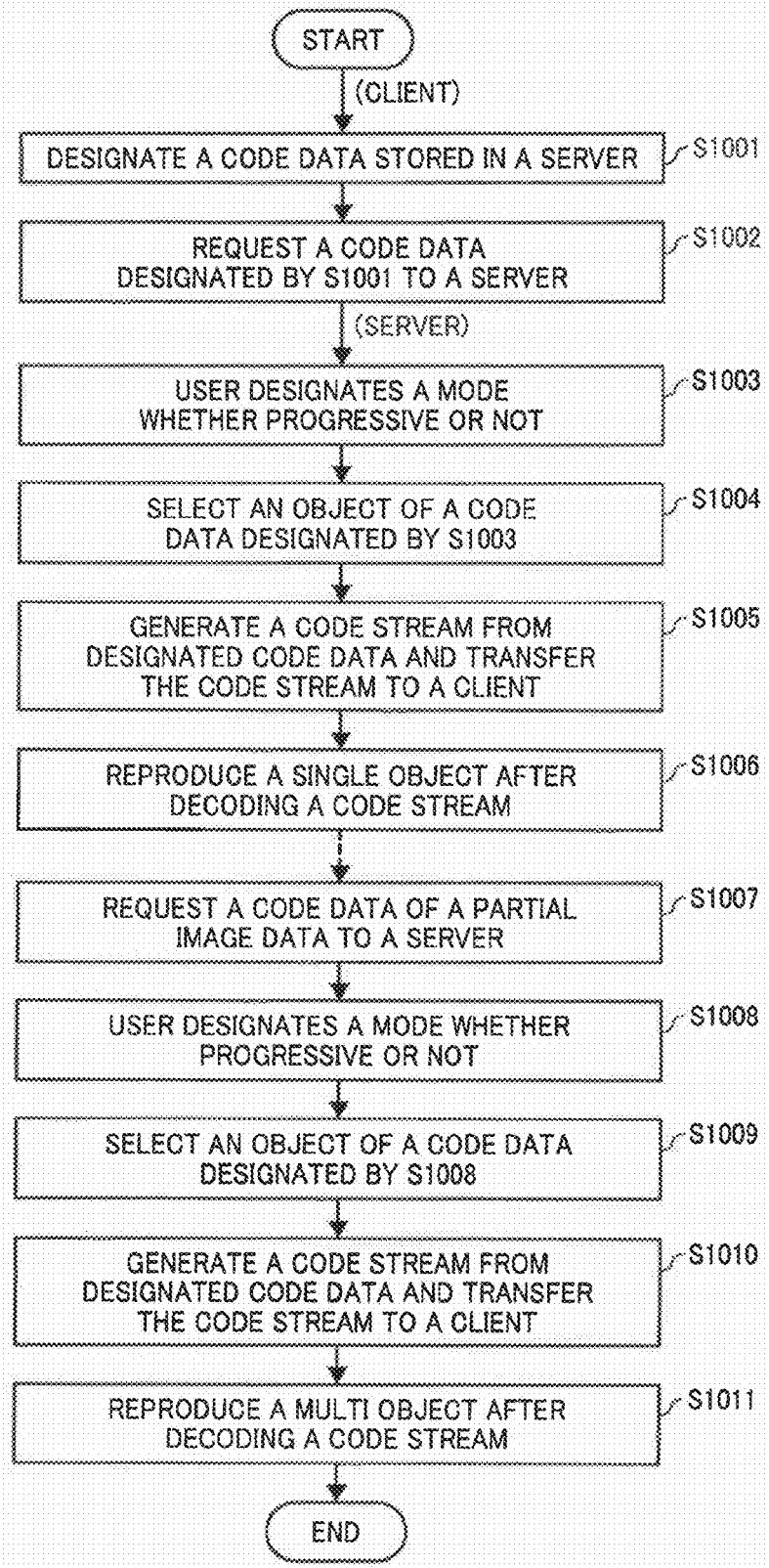

SYSTEM INCLUDING A SERVER AND AT LEAST A CLIENT

CROSS-REFERENCE TO RELATED APPLICATIONS

The present application claims priority to Japanese Patent Application No. 2007-078139 filed in the Japanese Patent Office on Mar. 26, 2007, the entire contents of which are hereby incorporated herein by reference.

BACKGROUND OF THE INVENTION

1. Field of the Invention

The present invention relates to a server and client system, which selects only one object from multiple objects.

2. Description of the Background Art

In this specification and drawings, the background data, the foreground data and the mask data are also respectively referred to in abbreviated form as the background, the foreground and the mask.

Generally, a document is made up of a mixture of characters, lines and images. Recently, in order to efficiently encode such a mixed document, a technique has been proposed to decompose the document (original image data) into background data, and one or a plurality of pairs of foreground data and mask data, and to independently encode these data.

For example, according to the Mixed Raster Content (MRC), the original image data is decomposed into the foreground data that is the color information of the characters, the mask data that is the character region information, and the background data that is the image information. The background data, the foreground data and the mask data are independently encoded. When reproducing the original image data, the foreground data or the background data is selected according to the mask data for each pixel. It is also possible to decompose the original image data into the background data and two or more pairs of the foreground data and the mask data, and to encode each of these data.

Since the recent proposal of the new encoding technique JPEG2000, the JPM (JPEG2000 Multi Layer) has been proposed to select the JPEG2000 for the compression technique that is to be used for the foreground data, the mask data and the background data of the MRC model. In addition, the JPIP (JPEG2000 Interactive Protocol) has been proposed to encode, transmit and receive only the codes of the desired region within the image that has been encoded by the JPEG2000 in a network environment. A brief description will be given with respect to such proposed techniques.

First, a description will be given of the JPM. According to the JPM, the original image data is decomposed into one background data (Base Page), and one or a plurality of layout objects that are called "pairs of foreground data and mask data". The background data of the JPM is treated as an initial page in which the layout object is plotted. The background data, the foreground data and the mask data are independently encoded, and the JPEG2000 can be selected as the encoding technique.

For example, when reproducing the original image data that has been decomposed into the background data, and the pair of foreground data and mask data, the original image data is formed from the foreground data and the background data according to the mask data. In this particular example, the background data that is formed becomes the reproduced image data. The original image can be reproduced by repeating a similar image combining procedure, even if the pairs of foreground data and mask data increase.

As a method of combining the background data and the foreground data, it is possible to employ a method (i) that selects the foreground data or the background data for each pixel or, a method (ii) that obtains a weighted average of the foreground data and the background data for each pixel.

According to the method (i), the mask data may be binary data, and the foreground data may be selected at the pixel position where the value of the mask data is "1", while the background data may be selected at the pixel position where the value of the mask data is "0". According to the method (ii), the mask data may be a positive 8-bit value, and the weighted average of the foreground data and the background data may be obtained for each pixel. In other words, the pixel value of the combined image may be calculated from (combined image)={(mask value)/255)}×(foreground)+[{255−(mask value)}/255]×(background). One of the methods (i) and (ii) to be employed can be specified for each pair of the foreground data and the mask data, and the method is specified in a header for each pair. The header will be described later in the specification.

The JPIP (JPEG2000 Interactive Protocol) is a forwarding protocol of a code data of the JPEG2000 in server client environment. The JPIP can access a JPM code data. The JPIP first outputs an image data according to user's request such as user understands an outline of an entire image. For example, an image data with a low resolution is displayed. The user watches the displayed image data, and changes the request. As a result, a code data of one particular area is read and decoded again.

A conventional technique extracts a code data from a code data composed of a multi object (JPM file) and partially transmits the JPM file.

However, the above technique needs to decode plural objects, when a system displays a low resolution image data because the code data is composed of a multi object. As a result, the system requires quite a lot of time for forwarding a code data and a decoding a code data.

SUMMARY OF THE INVENTION

A non-limiting embodiment of the present invention is designed to solve the above problems, by selecting a single object from multiple-objects, and decodes the single object. After time passes, the present invention outputs a remainder of the object. In addition, a non-limiting embodiment of the present invention reproduces the JPM code data progressively in each object.

In a non-limiting embodiment a system includes a server and at least a client, wherein the sever transfers a code data to the client, the client receives the code data from the server and decodes the code data. The client includes a requesting unit configured to request a code data stored in the server, a first receiving unit configured to receive the code data from the server, a decoding unit configured to decode the code data which is received from the server and a display unit configured to display an image data which is generated by the decoding unit. In addition, the server includes a second receiving unit configured to receive the request from a client, a selecting unit configured to select the code data which is requested from the client, a transferring unit configured to transfer the code data which is selected by the selecting unit, wherein the code data is a part of at least the code data of JPM file.

BRIEF DESCRIPTION OF THE DRAWINGS

The above and other objects, features and advantages of non-limiting embodiments of the present invention will become more apparent from the following detailed description taken with the accompanying drawings in which:

FIG. 3 is a diagram for explaining sub-bands at each decomposition level when there are three decomposition levels;

FIG. 10 is a diagram showing a structure of an SIZ marker segment;

FIG. 11 is a diagram showing a structure of a COD marker segment;

FIG. 16 is a flow diagram showing an example of the image processing program 10.

FIG. 29 is an example of a document data composed of the image data of three objects;

FIG. 45 is a flow diagram for explaining the setting of a priority order based on a structure of an image data;

FIG. 46 is a flow diagram for explaining the decoding progressively in multi page; and FIG. 47 is a flow diagram for explaining the processing of a plurality of pages.

DETAILED DESCRIPTION

As described above, in a case where a code A, which is obtained by compressing a first image, is to be converted into a code B, which is obtained by compressing a second image having ½ the resolution of the first image, for example, where the first and second images relate to the same image but have mutually different resolutions, the present inventors have found that it would be convenient when user wants to create the code B by simply editing the code A in the encoded state. Since this does not require that encoding and decoding steps be performed, the processing time is shortened. Also, this does not require the inverse quantization, and thereby, prevents unnecessary picture quality deterioration. Moreover, the present inventors have found that it would be more convenient if the original code A can be restored by simply editing the code B in the encoded state, since this would have the effect of concealing a portion of the code A from the user.

Furthermore, as also described above, the present inventors have found that it would be convenient to simply enlarge the size and/or increase the resolution of the image in an existing apparatus having the basic structure of the JPEG2000 without having a high-speed and high-performance processing circuit which uses the cubic convolution method as the third order interpolation method.

First, a general description will be given of the JPEG2000 algorithm which is used in the embodiments which will be described hereunder, so as to facilitate the understanding of the exemplary embodiments of the present invention.

Figure 1:
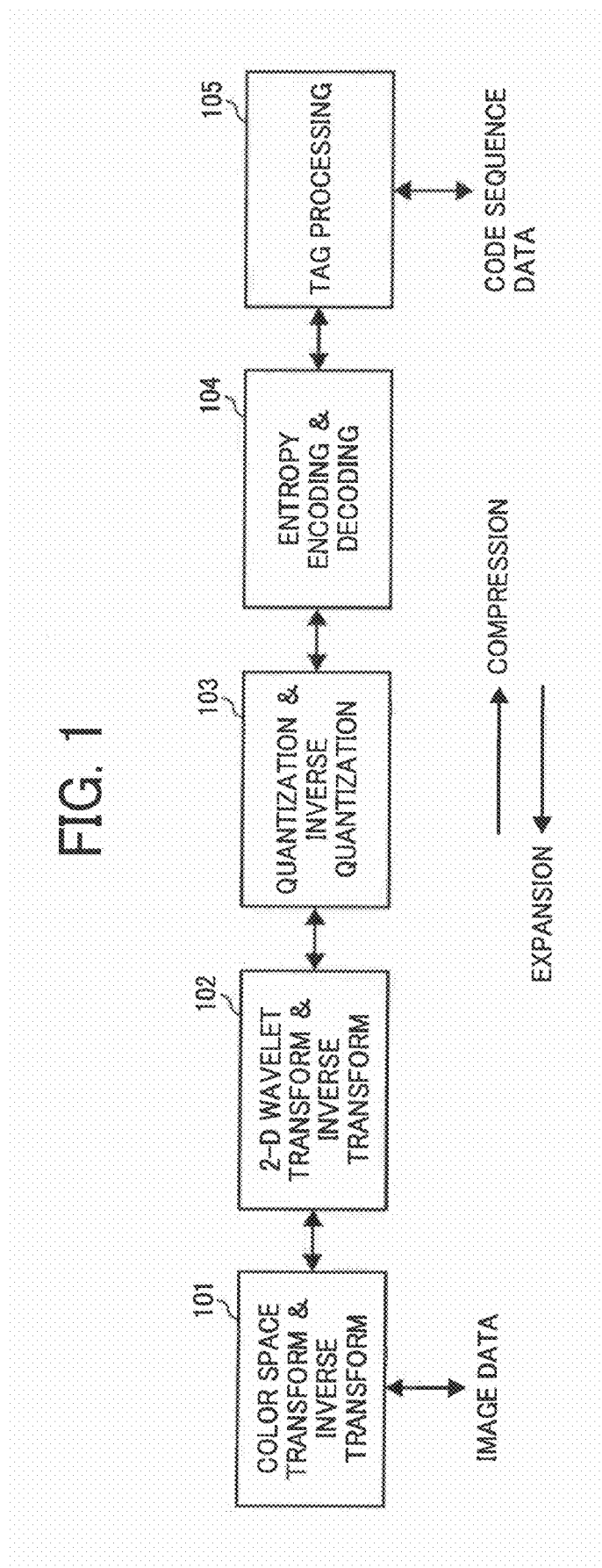
FIG. 1 is a functional block diagram showing a system for realizing the hierarchical encoding algorithm which forms a basis of the JPEG2000 which is used in an exemplary embodiment.

FIG. 1 is a functional block diagram showing a system for realizing the hierarchical encoding algorithm which forms a basis of the JPEG2000 which is used in the exemplary embodiments described herein. The system shown in FIG. 1 includes a color space transform and inverse transform section 101, a two-dimensional wavelet transform and inverse transform section 102, a quantization and inverse quantization section 103, an entropy encoding and decoding section 104, and a tag processing section 105.

The system shown in FIG. 1 greatly differs from the conventional JPEG algorithm on several points. One differing point of the system shown in FIG. 1, compared to the JPEG algorithm, is the transformation algorithm used. Although the JPEG algorithm uses the Discrete Cosine Transform (DCT), the hierarchical encoding algorithm uses the Discrete Wavelet Transform (DWT) in the two-dimensional wavelet transform and inverse transform section 102. The DWT has an advantage over the DCT in that the picture quality in the high compression region is improved, and this is one of the reasons the DWT is used with the JPEG2000 algorithm, which is to succeed the JPEG algorithm.

Another differing point of the system shown in FIG. 1, compared to the JPEG algorithm, is the provision of the tag processing section 105 at the final stage of the system to form the code. In the tag processing section 105, compressed data is generated as code sequence data at the time of image compression, and code sequence data necessary for the expansion is interpreted at the time of the image expansion. The JPEG2000 can realize various convenient functions by use of the code sequence data. For example, it is possible to freely stop the compression and expansion operation with respect to the still image at an arbitrary hierarchical level (decomposition level) corresponding to an octave division of the block-based DWT, as will be described later with reference to FIG. 3. In addition, it is possible to carry out operations such as obtaining a low-resolution image (or a reduced image) from one file, and obtaining a part (tiling image) of the image.

The color space transform and inverse transform section 101 is connected in most cases to the input and output section with respect to the original image. For example, the RGB calorimetric system made up of each of the red (R), green (G) and blue (B) components of the primary color system or, the YMC calorimetric system made up of each of the yellow (Y), magenta (M) and cyan (C) components of the complementary color system, is subjected to the transform or inverse transform to the YUV calorimetric system or the YCbCr calorimetric system.

Figure 2:
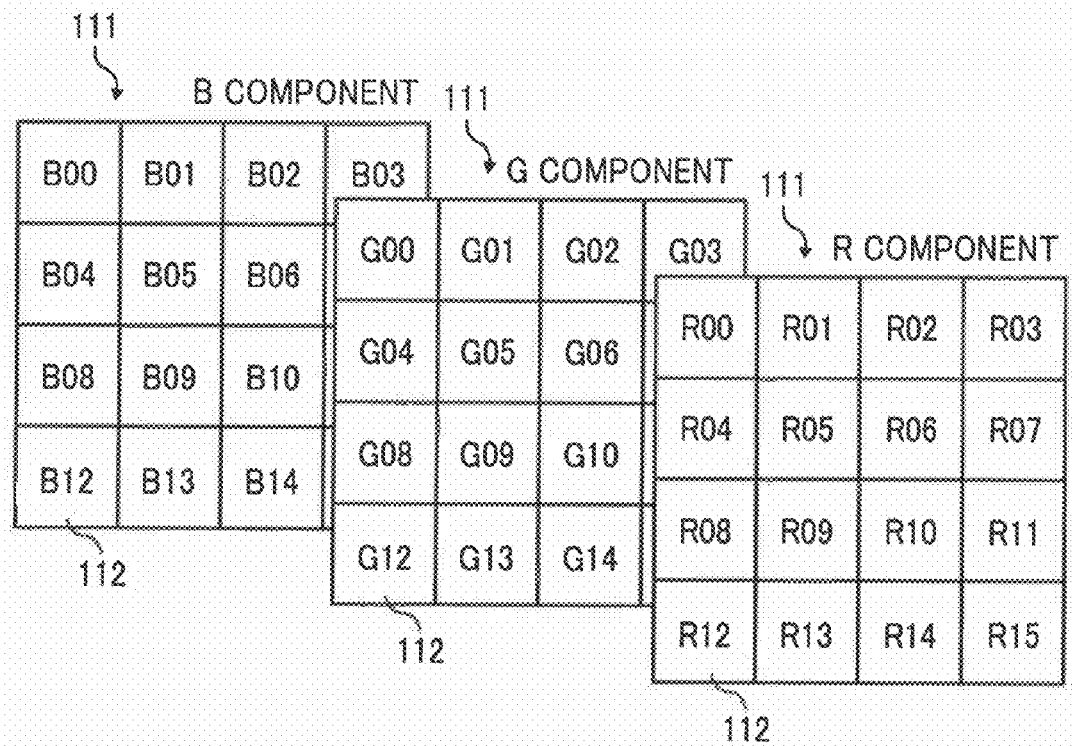
FIG. 2 is a diagram showing divided rectangular regions of each of color components of an original image.

Next, a description will be given of the algorithm of the JPEG 2000. FIG. 2 is a diagram showing divided rectangular regions of each of the color components of the original image. As shown in FIG. 2, each of the R, G and B components 111 (of the RGB primary color system) of the original image is divided into rectangular regions. Each rectangular region is generally referred to as a block or a tile. The rectangular region is generally referred to as the tile in the case of the JPEG2000, and thus, the rectangular region will hereinafter be referred to as the tile. In the particular case shown in FIG. 2, each component 111 is divided into four tiles 112 in the vertical direction and four tiles 112 in the horizontal direction, that is, a total of 16 (=4.times.4) tiles 112. The R component 111 is made up of tiles R00, R01, . . . , R15, the G component 111 is made up of tiles G00, G01, . . . , G15, and the B component 111 is made up of tiles B00, B01, . . . , B15. The tile forms the basic unit when carrying out the compression and expansion process with respect to the image data. Hence, the compression and expansion of the image data is carried out independently for each component 111 and for each tile 112.

When encoding the image data, the data of each tile 112 of each component 111 is input to the color space transform and inverse transform section 101 shown in FIG. 1. After the data is subjected to the color space transform, a two-dimensional wavelet transform (forward transform) is carried out in the two-dimensional wavelet transform and inverse transform section 102, so as to spatially divide the data into frequency bands.

FIG. 3 is a diagram for explaining sub-bands at each decomposition level when there are three decomposition levels. With respect to a tile original image 0LL (decomposition level 0) obtained by dividing the original image into the tiles, the two-dimensional wavelet transform is carried out to separate sub-bands 1LL, 1HL, 1LH and 1HH indicated by a decomposition level 1. Then, with respect to a low-frequency component 1LL in this hierarchical level, the two-dimensional wavelet transform is carried out to separate sub-bands 2LL, 2HL, 2LH and 2HH indicated by a decomposition level 2. Similarly thereafter, the two-dimensional wavelet transform is carried out with respect to a low-frequency component 2LL to separate sub-bands 3LL, 3HL, 3LH and 3HH indicated by a decomposition level 3. In FIG. 3, the sub-bands which are to be subjected to the encoding at each decomposition level are indicated by halftone dot meshing. For example, if there are three decomposition levels, the sub-bands 3HL, 3LH, 3HH, 2HL, 2LH, 2HH, 1HL, 1HL and 1HH indicated by the halftone dot meshing are to be subjected to the encoding, and the sub-band 3LL is not encoded.

Next, target bits which are to be subjected to the encoding are determined in the order of the specified encoding, and a context is generated from neighboring bits of the target bits in the quantization and inverse quantization section 103 shown in FIG. 1.

Figure 4:
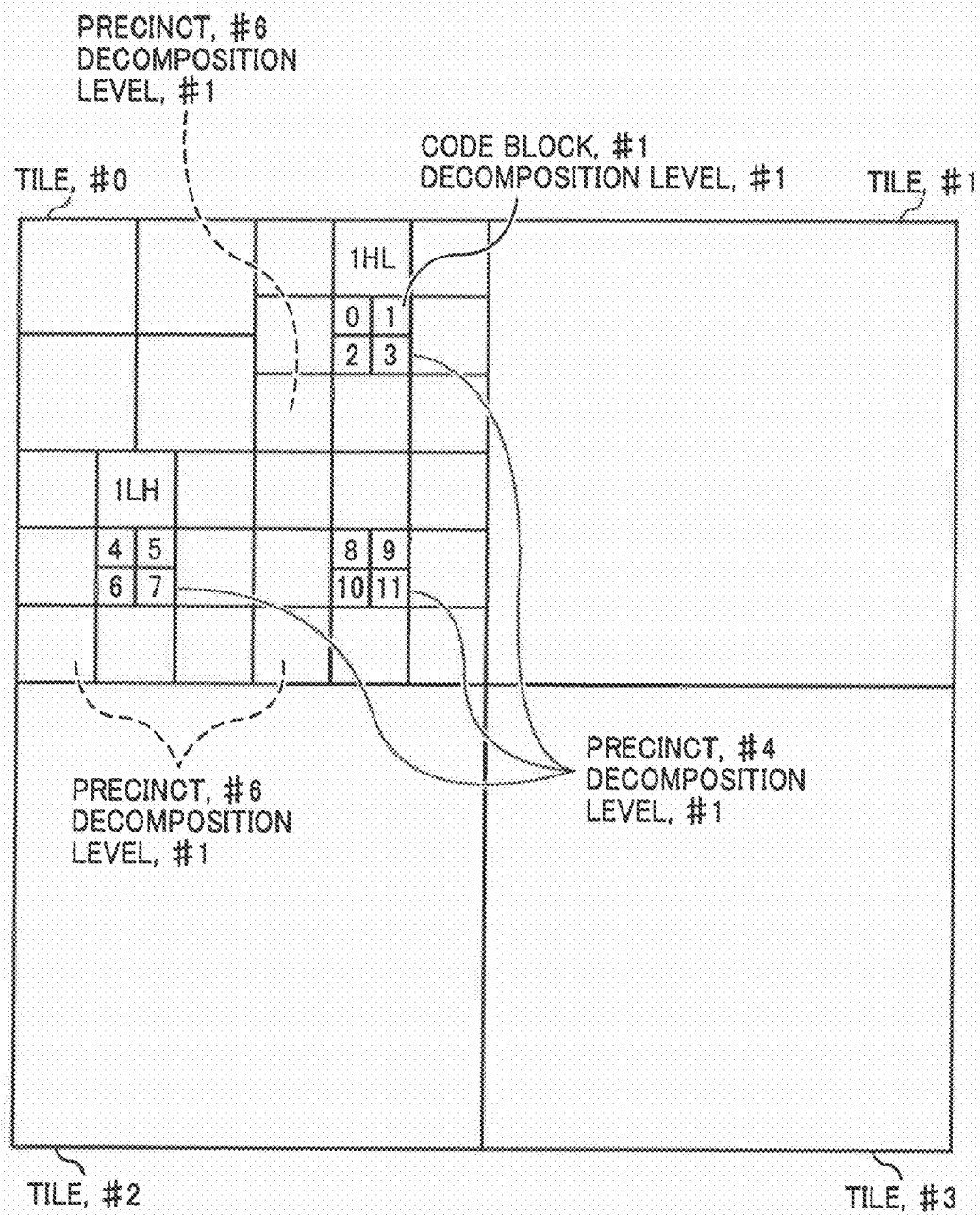
FIG. 4 is a diagram showing precinct.

The wavelet coefficients after the quantization process ends are divided into non-overlapping rectangles called "precinct" for each of the sub-bands. The precinct is introduced to effectively utilize the memory upon implementation. FIG. 4 is a diagram showing the precinct. As shown in FIG. 4, one precinct is made up of three spatially matching rectangular regions. Furthermore, each precinct is divided into "code blocks" of non-overlapping rectangles. The code block becomes a basic unit of entropy encoding.

The coefficient values after the wavelet transform may be quantized and encoded as they are. But in the case of the JPEG2000, the coefficient values are decomposed into "bit plane" units in order to improve the encoding efficiency, and the "bit plane" may be ordered for every pixel or code block.

Figure 5:
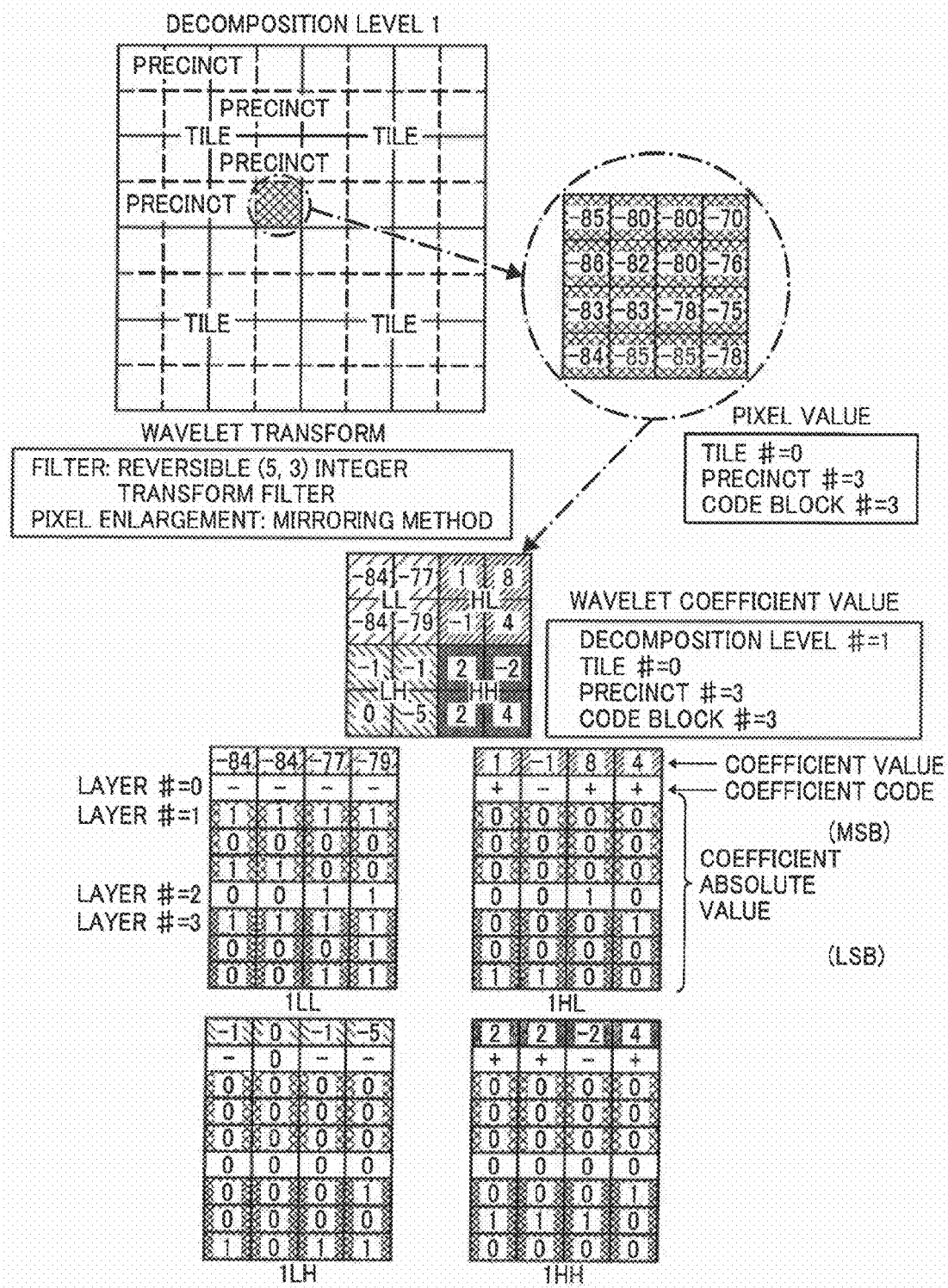
FIG. 5 is a diagram showing an ordering procedure with respect to a bit plane.

FIG. 5 is a diagram showing an ordering procedure with respect to the bit plane. FIG. 5 shows a case where the original image having 32.times.32 pixels is divided into four tiles each having 16.times.16 pixels, and the precinct and the code block of the decomposition level 1 respectively have sizes of 8.times.8 pixels and 4.times.4 pixels. The precinct and the code block are numbered in the raster sequence, and in this particular case, precinct numbers (#) 0 to 3 are allocated to the precincts, and code block numbers (#) 0 to 3 are allocated to the code blocks. A mirroring method is used for the pixel enlargement with respect to the outside of the tile boundary, and the wavelet transform is carried out by a reversible (5, 3) filter to obtain the wavelet coefficient values of the decomposition level 1.

In addition, FIG. 5 also shows the concept of a typical "layer" structure for the tile number (#) 0, the precinct number (#) 3 and the code block number (#) 3. The code block after the transform is divided into the sub-bands 1LL, 1HL, 1LH and 1HH, and the wavelet coefficient is allocated to each sub-band.

The layer structure is easier to understand when the wavelet coefficient values are viewed from the horizontal direction (bit plane direction). One layer is formed by an arbitrary number of bit planes. In this particular case, each of the layer numbers (#) 0, 1, 2 and 3 is made up of the bit plane numbers (#) 1, 3, 1 and 3. The layers including the bit plane closer to the least significant bit (LSB) are subjected to the quantization earlier, and the layers including the bit plane closer to the most significant bit (MSB) are subjected to the quantization later and remain unquantized until the end or remain unquantized to the end. The method which discards the layers closer to the LSB is called truncation, and is capable of finely controlling the quantization rate.

In the entropy encoding and decoding section 104 shown in FIG. 1, the encoding with respect to the tiles 112 of each component 111 is carried out by probability estimation based on the context and the target bit. The encoding process is carried out in units of the tiles 112 for all of the components 111 of the original image. Finally, the tag processing section 105 combines all of the encoded data from the entropy encoding and decoding section 104 into one code sequence data, and adds a tag to the code sequence data.

On the other hand, when decoding the encoded data, the image data is generated from the code sequence data of each tile 112 of each component 111, in a manner in reverse to that at the time of encoding the image data. In this case, the tag processing section 105 analyzes the tag information which is added to the code sequence data which is input from the outside, decomposes the code sequence data into the code sequence data of each tile 112 of each component 111, and carries out the decoding process (expansion process) for every code sequence data of each tile 112 of each component 111. In this state, the position of the bit to be subjected to the decoding is determined in the order based on the tag information within the coded sequence data, and the quantization and inverse quantization section 103 generates the context from the arrangement of the neighboring bits (decoding of which is already ended) to the target bit position. The entropy encoding and decoding section 104 carries out the decoding by the probability estimation based on the context and the coded sequence data to generate the target bit, and the generated target bit is written at the position of the target bit. Since the decoded data is spatially divided for every frequency band, each tile of each component of the image data can be restored by subjecting the decoded data to the two-dimensional wavelet inverse transform in the two-dimensional wavelet transform and inverse transform section 102. The restored data is transformed into the image data of the original calorimetric system by the color space transform and inverse transform section 101.

Figure 6:
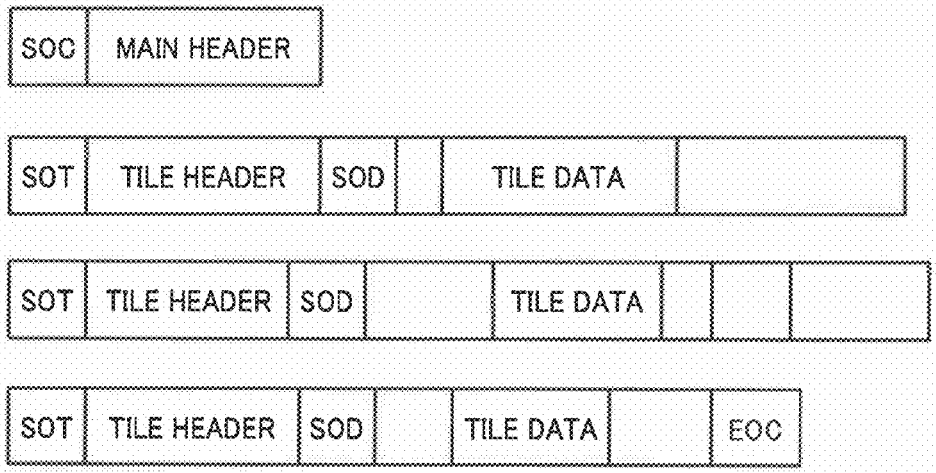
FIG. 6 is a diagram generally showing a code format of JPEG2000.

Next, a description will be given of the structures of header information and marker segments used by the code according to the JPEG2000, by referring to the code format of the JPEG2000. FIG. 6 is a diagram generally showing the code format of the JPEG2000. The code format shown in FIG. 6 starts from a Start of Codestream (SOC), followed by a main header and the actual coded data. Encoding parameters and quantization parameters are written in the SOC. The actual code data starts with a Start of Tile-part (SOT) marker, and is formed by a tile header, a Start of Data (SOD) marker and tile data (code). An End of Codestream (EOC) marker which indicates the end of the code is added after the coded data corresponding to the entire image.

Figure 7:
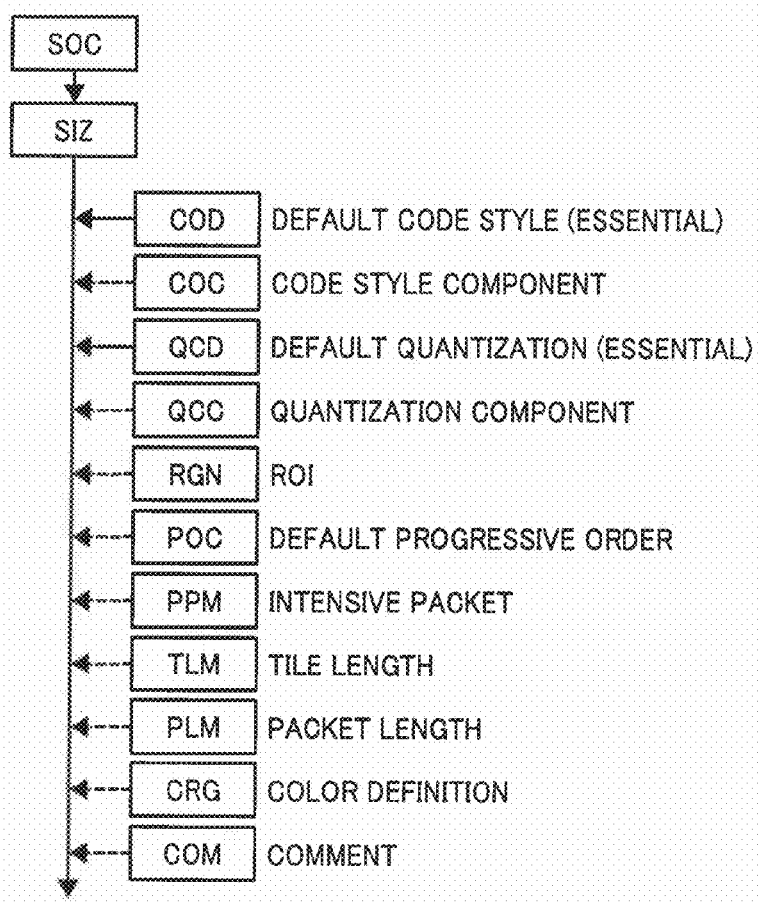
FIG. 7 is a diagram showing a main header of the coding format of the JPEG2000.

FIG. 7 is a diagram showing the main header of the coding format of the JPEG2000. As shown in FIG. 7, the main header includes essential marker segments COD and QCD, and optional marker segments COC, QCC, RGN, POC, PPM, TLM, PLM, CRG and COM.

Figure 8A:
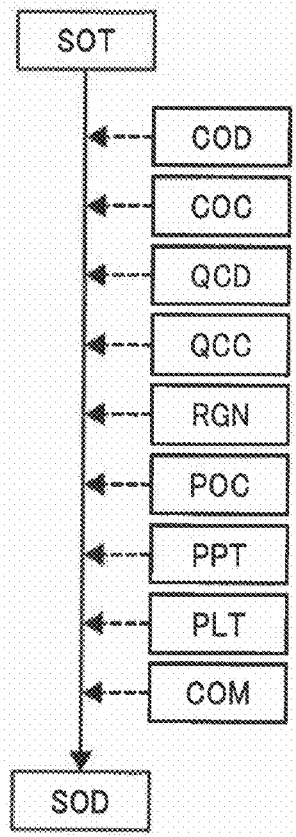
FIGS. 8A and 8B are diagrams showing a tile header of the coding format of the JPEG2000.
Figure 8B:
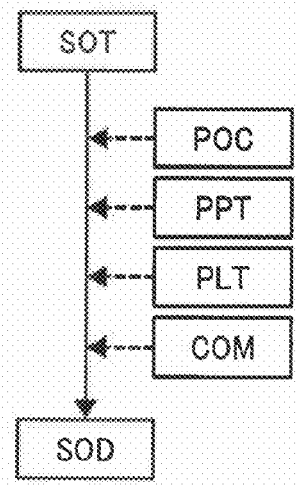

FIG. 8(A) and FIG. 8(B) are diagrams showing the tile header of the coding format of the JPEG2000. FIG. 8A shows a marker segment sequence which is added to the head of the tile header, and marker segments (all optional) COD, COC, QCD, QCC, RGN, POC, PPT, PLT and COM may be used therefore. On the other hand, FIG. 8B shows a marker segment sequence which is added to the head of a divided tile part sequence which is obtained when the inside of the tile is divided into a plurality of tile parts, and marker segments (all optional) POC, PPT, PLT and COM may be used therefore.

A description will be given of the markers and the marker segments used by the JPEG2000. The marker is formed by two bytes, where a head byte is 0xff and the following bytes are 0x01, . . . , 0xfe. The marker and the marker segment may be categorized into the following six kinds.

(1) Frame sectioning (delimiting)
(2) Information related to position and size of image (fixed information)
(3) Information related to encoding function (functional)
(4) Withstand characteristic with respect to error (in bit stream)
(5) Pointer of bit stream (pointer)
(6) Auxiliary information (informational)

Of the kinds described above, the kinds (1) through (3) of the marker (that is, delimiting marker, fixed information marker, and functional marker) and marker segments are related to the present invention, and a description will be given thereof in the following.

Figure 9:
FIG. 9 is a diagram showing a structure of an SOT marker segment.

First, a description will be given of the delimiting marker and marker segment. The delimiting marker and marker segment are essential, and include SOC, SOT, SOD and EOC. The SOC is added to the head of the code sequence. The SOT is added to the head of the tile code sequence. FIG. 9 is a diagram showing a structure of the SOT marker segment. The SOT marker segment includes contents Lsot, Isot, Psot, TPsot and TNsot. The size of the marker segment is written in Lsot, the tile number (a number starting from 0 and assigned in the raster sequence) is written Isot, the tile length is written in Psot, the tile part number is written in TPsot, and the number of tile parts is written in TNsot. The Isot indicated by the halftone dot meshing in FIG. 9 forms the header information part which is to be subjected to the rewriting when the tile number is to be changed.

Next, a description will be given of the fixed information marker segment. The information related to the image is written in the fixed information marker, and an SIZ marker is used as the fixed information marker. An SIZ marker segment is added immediately after the SOC marker. The marker segment length depends on the number of components. FIG. 10 is a diagram showing a structure of the SIZ marker segment. The SIZ marker segment includes contents Lsiz, Rsiz, Xsiz, Ysiz, XOsiz, YOsiz, XTsiz, YTsiz, XTOsiz, YTOsiz, Csiz, Ssiz(i), XRsiz(i) and YRsiz(i). The size of the marker segment is written in Lsiz, the code sequence compatibility (0: fixed, other than 0: reserved) is written in Rsiz, the horizontal direction size on a reference grid is written in Xsiz, the vertical direction size on the reference grid is written in Ysiz, the offset position in the horizontal direction of the image from an origin on the reference grid is written in XOsiz, the offset position in the vertical direction of the image from the origin on the reference grid is written in YOsiz, the horizontal direction size of the tile is written in XTsiz, the vertical direction size of the tile is written in YTsiz, the horizontal direction offset position of the tile from the origin on the reference grid is written in XTOsiz, the vertical direction offset position of the tile from the origin on the reference grid is written in YTOsiz, the number of components is written in Csiz, the sign and the number of bits at the ith component is written in Ssiz(i), the sampling distance in the horizontal direction at the ith component is written in XRsiz(i), and the sampling distance in the vertical direction at the ith component is written in YRsiz(i).

The Xsiz, Ysiz, XTsiz and YTsiz which are related to the image size and the tile size and indicated by the halftone dot meshing in FIG. 10 form the header information part which is to be written when the resolution level is to be changed. In addition, the Csiz, Ssiz, XRsiz and YRsiz form the header information part which is to be written when the number of components is to be reduced. In addition, the XRsiz and YRsiz form the header information part which is to be written when the number of tiles is to be reduced.

Next a description will be given of the functional marker segment. The functional marker segment indicates the functions of the code which is obtained by the encoding. In a case where the tile is divided into a plurality of tile parts, the functional marker segment is added to the head tile part (Tsot=0). COD, COC, QCD, QCC and the like may be used for the functional marker segment.

The COD is essential, and a default coding style is written in the COD. The marker length depends on the length of Scod. FIG. 11 is a diagram showing a structure of the COD marker segment. The COD marker segment includes contents Lcod, Scod, SGcod and SPcod. The size of the marker segment is written in Lcod, the coding style with respect to all of the components is written in Scod, the parameters of the coding style which does not depend on the component is written in SGcod, and the parameters of the coding style related to the component is written in SPcod.

The Lcod and SPcod indicated by the halftone dot meshing in FIG. 11 form the header information part which is to be written when the resolution level is to be changed. In addition, the SGcod forms the header information part which is to be rewritten when the number of components is to be reduced or the number of layers is to be reduced.

The contents of the SGcod (32 bits) include a part where the "progressive order" is written in 8 bits, a part where the "number of layers" is written in 16 bits, and a part where information related to the "color transformation" is written in 8 bits. The progressive order will be described later in more detail. But for example, the progressive order is set to a value "0000 0000" in a case where "layer">>"resolution">>"component">>"position", and is set to a value "0000 0001" in a case where "resolution">>"layer">- ;>"component">>"position". The progressive order is set to a value "0000 0010" in a case where "resolution">>"position">>"-component">>"layer", and is set to a value "0000 0011" in a case where "position">>"component">>"resolution">>"layer". The progressive order is set to a value ""0000 0100" in a case where "component">>"position">>"resolution">>"layer". In addition, the color transformation is set to a value "0000 0000" in a case where the color transformation is undefined. The color transformation is set to a value "0000 0001" in ICT (irreversible transform) when a 9-7 filter is used, and in RCT (reversible transform) when a 5-3 filter is used. The part of the SGcod related to the number of layers forms the header information part which is to be rewritten when the number of layers is to be reduced. On the other hand, the color transformation part of the SGcod forms the header information part which is to be rewritten when the number of components is to be reduced.

The contents of the SPcod include a part where the number of decompositions (decomposition levels) is written, a part where the size of the code block is written, a part where the wavelet transform (9-7 irreversible transform or 5-3 reversible transform) is written, a part where the precinct size is written, and the like. The part related to the precinct size is written with the horizontal direction size (an index number PPx of exponent of 2) and the vertical direction size (an index number PPy of exponent of 2). The parts of the SPcod related to the number of decompositions and the precinct size form the header information part which is to be rewritten when the resolution level is to be changed.

Exception of the coding style is written in the component coding style marker COC, and this component coding style marker COC is added when the encoding different from the COD is to be made. In the case where the tile is divided into a plurality of tile parts, the marker length added to the head tile depends on the length of the Scoc. The priority order of the COD and the COD is "COC added to tile part">"COD added to tile part">"COC of main header">"COD of main header".

Figure 12:
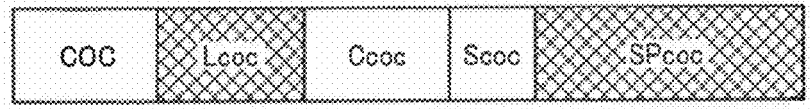
FIG. 12 is a diagram showing a structure of a COC marker segment.

FIG. 12 is a diagram showing a structure of the COC marker segment. The COC marker segment includes Lcoc, Ccoc, Scoc and SPcoc. The size of the marker segment is written in the Lcoc, and the component number (8 bits or 16 bits depending on the value of Csiz) is written in the Ccoc. The coding style with respect to the instant component is written in the Scoc, and the parameters of the coding style are written in the SPcoc. The Lcoc and SPcoc indicated by the halftone dot meshing in FIG. 12 form the header information part which is to be rewritten when the resolution level is to be changed.

The default quantization marker QCD is written with the default quantization style. The default quantization marker QCD is added to the head tile in a case where the tile is divided into a plurality of tile parts. The marker length depends on the number of quantization values.

Figure 13:
FIG. 13 is a diagram showing a structure of a QCD marker segment.

FIG. 13 is a diagram showing a structure of the QCD marker segment. The QCD marker segment includes Lqcd, Sqcd and SPqcd. The size of the marker segment is written in the Lqcd. The quantization style with respect to all of the components is written in the Sqcd. The total number of bit planes to be encoded (total number of bit planes of the wavelet coefficients) is written in the SPqcd as the quantization step size. The Lqcd and SPqcd indicated by the halftone dot meshing in FIG. 13 form the header information part which is to be rewritten when the resolution level is to be changed.

The component quantization marker QCC is added when a quantization different from that of the QCD is to be made. The component quantization marker QCC is added to the head tile in a case where the tile is divided into a plurality of tile parts. The marker length depends on the number of quantization values. The priority order of the QCD and the QCC is "QCC added to tile part">"QCD added to tile part".

Figure 14:
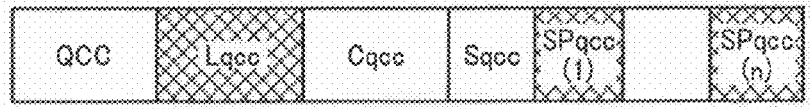
FIG. 14 is a diagram showing a structure of a QCC marker segment.

FIG. 14 is a diagram showing a structure of the QCC marker segment. The QCC marker segment includes Lqcc, Cqcc, Sqcc and SPqcc. The size of the marker segment is written in the Lqcc, and the component number (8 bits or 16 bits depending on the value of Csiz) is written in the Cqcc. The coding style with respect to the instant component is written in the Sqcc, and the total number of bit planes to be encoded (dynamic range of wavelet coefficients) is written in the SPqcc as the quantization step size. The Lqcc and SPqcc indicated by the halftone dot meshing in FIG. 14 form the header information part which is to be rewritten when the resolution level is to be changed.

Next, a description will be given of the reason why it is possible to decode (that is, partially decode) the codes which are less than the maintained codes, by only rewriting the header information within the codes in the state where the code information other than the header information is maintained in the original state.

Figure 15:
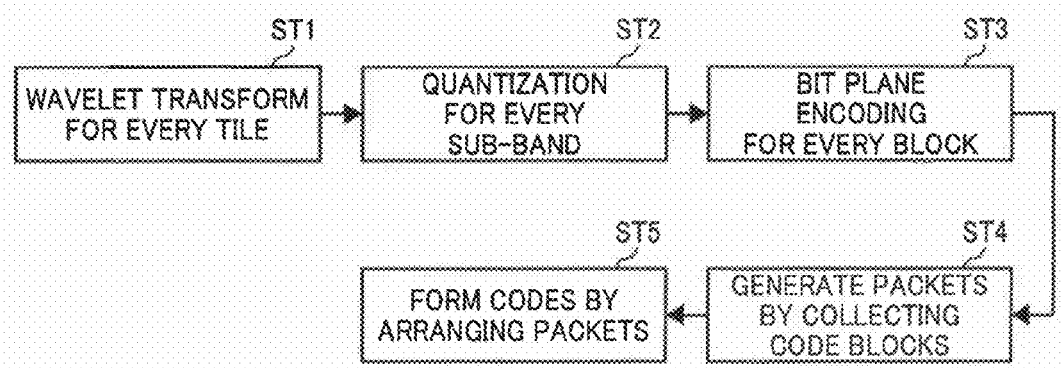
FIG. 15 is a diagram generally showing a process flow of an encoding system of the JPEG2000.

The encoding process of the JPEG2000 was described above with reference to FIG. 1. The process flow of the encoding process can generally be rewritten in a manner shown in FIG. 15. FIG. 15 is a diagram generally showing the process flow of the encoding process of the JPEG2000. A step ST1 carries out the wavelet transform for every tile, and a step ST2 carries out the quantization for every sub-band. A step ST3 carries out the bit plane encoding for every code block. Thereafter, a step ST4 generates packets by collecting the codes of the code blocks, and a step ST5 arranges the packets to form the codes. In the last two blocks, the code forming process arranges the code units, called "packets", in a desired order.

Although the JPEG2000 was generally described above, a description will be given of the relationship of the "image", "tile", "sub-band", "precinct" and "code block", and the relationship of the "packet" and "layer", by referring to FIG. 16. FIG. 16 is a diagram for explaining the relationships of the image, the tile, the sub-band, the precinct and the code block.

First, the physical sizes of the image, the tile, the sub-band, the precinct and the code block have a relationship "image"≧"tile"≧"sub-band"≧"precinct"≧"code block".

The tile is obtained when the image is divided into rectangular regions, and the image is equal to the tile if the number of divisions (rectangular regions) is one. The precinct is obtained by dividing the sub-band into rectangles, and roughly indicates the position within the image. Three precincts obtained by dividing the three sub-bands HL, LH and HH form a group. However, the precinct obtained by dividing the sub-band LL forms a group by itself. The precinct and the sub-band may have the same size. The code block is obtained by further dividing the precinct into rectangles.

The packet is a collection of a portion of the codes obtained from all of the code blocks included in the precinct. For example, the packet is a collection of the codes from the MSB to the third bit plane of all of the code blocks. The "portion" of the codes includes "vacant", and thus, the contents of the packet may be a "vacant" code. When the packets of all of the precincts (=all code blocks=all sub-bands) are collected, a part of the codes of the entire image region, that is, the layer, is formed. For example, the part of the codes of the entire image region may be the codes from the MSB to the third bit plane of the wavelet coefficients for the entire image region. Since the layer is roughly a part of the codes of the bit planes of the entire image region, the picture quality is improved as the number of layers which are decoded increases. In other words, the layer may be regarded as a unit of indicating the picture quality.

Therefore, when all of the layers are collected, the codes of all of the bit planes of the entire image region are obtained.

Figure 17A:
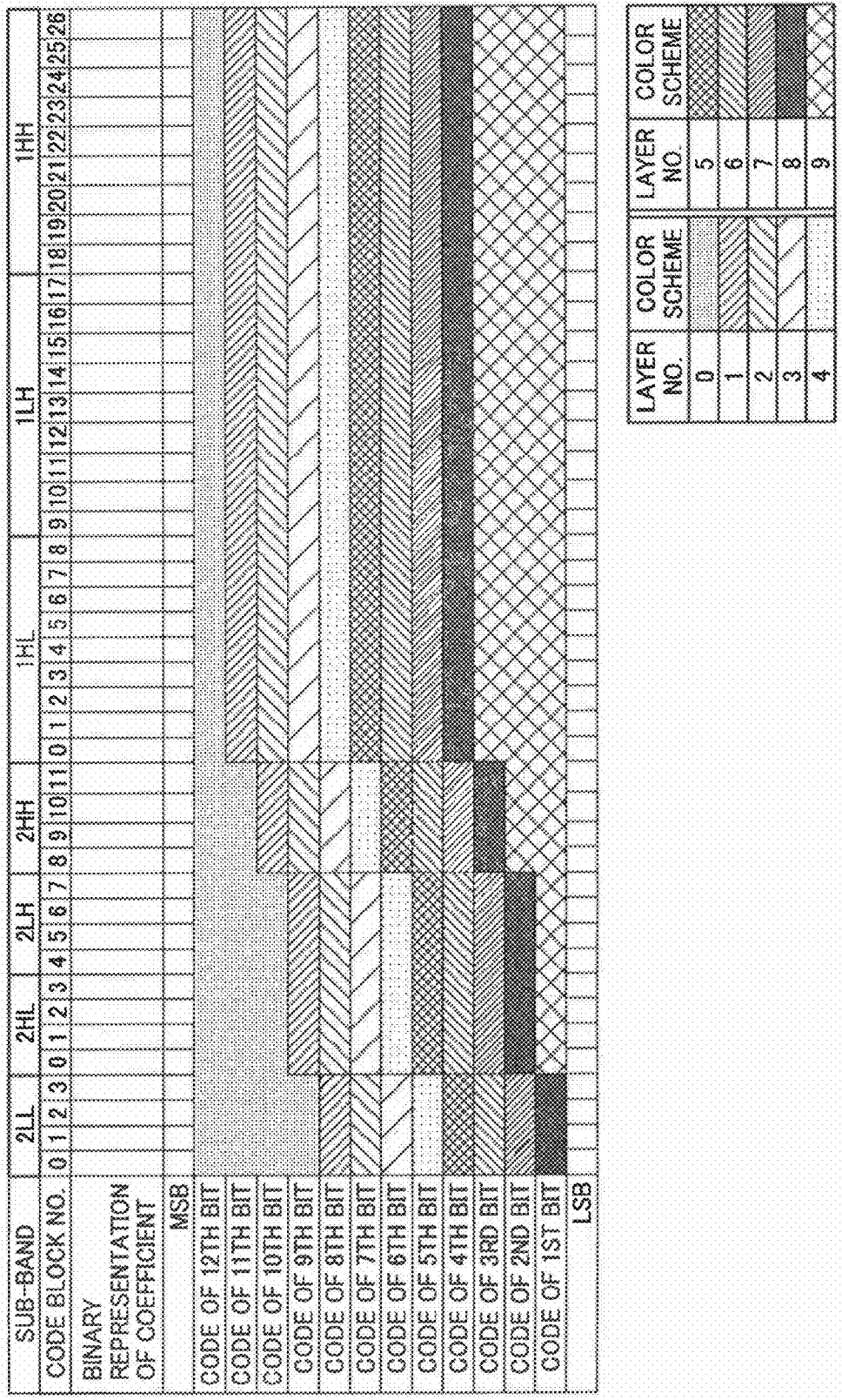
FIGS. 17A and 17B are diagrams for explaining a relationship of a layer and a packet.
Figure 17B:
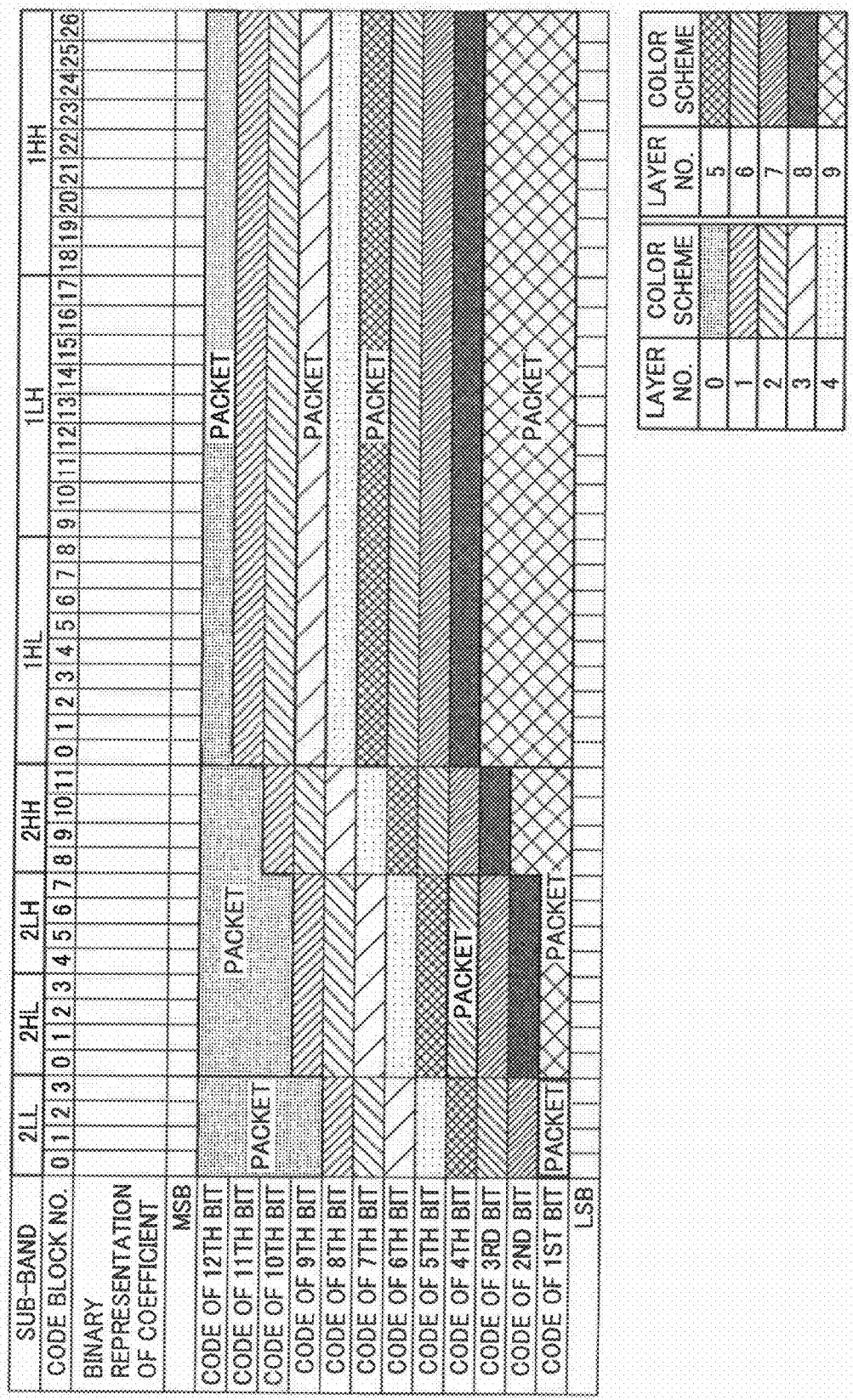

FIGS. 17A and 17B are diagrams for explaining a relationship of the layer and the packet. FIGS. 17A and 17B show the relationship of the layer and the packets included in the layer, for a case where the number of hierarchical layers (decomposition levels) of the wavelet transform is 2, and the precinct size is equal to the sub-band size. Since the packet is in units of precincts, the packet spans the sub-bands HL to HH when the precinct is equal to the sub-band. FIG. 17B shows some of the packets surrounded by a bold line.

Such an arrangement of the packets shown in FIG. 17B is called the "progressive order", which will be described hereunder. According to the code sequence control of the JPEG2000, the final code sequence suited for the purpose is generated based on the code sequence which is subjected to the entropy encoding. The purpose in this-case includes the picture quality, the resolution, the progressive order related to the picture quality and the resolution, the code size, and the like. For example, with respect to the picture quality, the picture quality level may be set in several stages, and the end point with respect to the code sequence of every block may be determined so as to form an optimum code with respect to the set picture quality level. Various methods may be employed to determine the code end point. For example, it is possible to determine the code end point using an amount of code increase (.DELTA.R) and a picture quality improvement (.DELTA.D) which are calculated at the time of the entropy encoding.

Figure 18A:
FIGS. 18A and 18B are diagrams for explaining code sequence for improving the resolution and picture quality in relation to a progressive order.
Figure 18B:
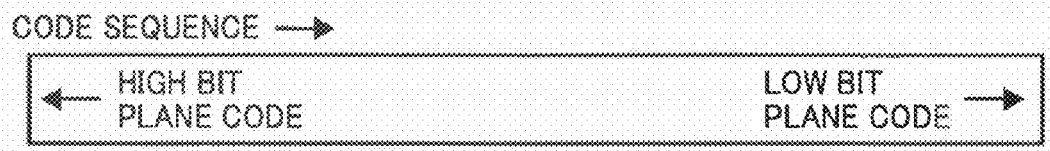

The progressive order may roughly be categorized into a first system which improves the spatial resolution and a second system which improves a signal-to-noise ratio (SNR) picture quality. FIGS. 18A and 18B are diagrams for explaining code sequences for improving the resolution and picture quality in relation to the progressive order. The first system successively forms the codes from the low-frequency sub-bands as shown in FIG. 18A, and the resolution gradually becomes high. On the other hand, the second system utilizes the bit plane encoding, and as shown in FIG. 18B, the codes are successively formed from the higher bit planes, and the resolution is constant while the picture quality gradually improves. The JPEG has the progressive function for the resolution and the coefficients as an extended function, but since a process such as resolution conversion is required in order to progressively improve the spatial resolution, the DCT becomes necessary each time. Accordingly, the progressive order described above is a characterizing feature of the JPEG2000. Another characterizing feature of the JPEG2000 is that a mutual conversion is possible between the progressive order of the first system and the progressive order of the second system by rearranging the codes.

Five methods LRCP, RLCP, RPCL, PCRL and CPRL are defined with respect to the progressive order, depending on combinations of the resolution (or resolution level), precinct (or position), color component (or component) and layer.

Figure 19:
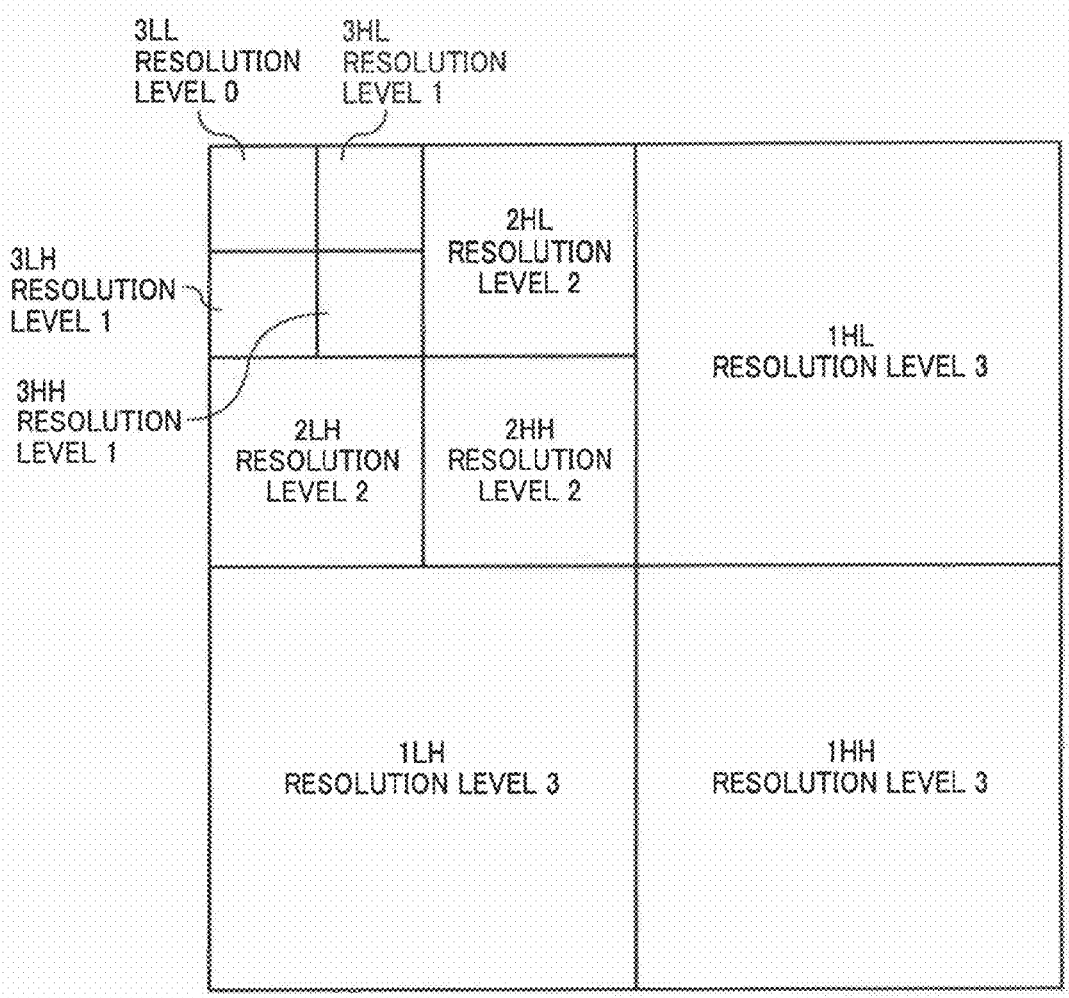
FIG. 19 is a diagram for explaining a relationship of a decomposition level and a resolution level.

LRCP=Layer-Resolution Level-Component-Position
RLCP=Resolution Level-Layer-Component-Position
RPCL=Resolution Level-Position-Component-Layer
PCRL=Position-Component-Resolution Level-Layer
CPRL=Component-Position-Resolution Level-Layer FIG. 19 is a diagram for explaining a relationship between the decomposition level and the resolution level. The relationship between the decomposition level (number of wavelet transforms to be carried out) and the resolution level, that is, the definitions of the terms, are as shown in FIG. 19. FIG. 19 shows a case where there are three decomposition levels.

A description will be given of the arrangement of the packets in the progressive order by the encoder, and the decoding of the packets in the progressive order by the decoder.

In a case where the progressive order is the LRCP order, the arrangement of the packets (at the time of encoding) and the analyzing of the packets (at the time of decoding) are carried out in the following order according to the JPEG2000 standard specifications.

1 for (layer) {for (resolution) {for (component) {for (precinct) {At time of encoding: arrange packets At time of decoding: analyze packets}}}}

The packet itself has the packet header, but the layer number, resolution number and the like are not written in the header. When judging the layer and the resolution of the packet at the time of the decoding, the above described "for" loop is formed from the progressive order specified by the COD tag within the main or tile-part header information, so as to determine the "for" loop in which the packet is handled.

The number of layers, the number of resolutions, the number of components and the number of precincts can be read from the tag within the main or tile-part header information, as described above. The number of precincts can be calculated because the precinct size can be obtained from the tag. Hence, the number of packets can be counted as long as the boundary of the packets can be judged.

A description will be given of a packet header (header at the head of the packet). The length of the code included in the packet is written in the packet header. Hence, the boundary of the packets can be counted.

The packet is a minimum unit of code sequence (in units of bytes) which becomes the basis, and indicates the code sequence of a specific tile, layer, color component, reduction level and precinct. The code sequence with respect to the LL component becomes a target at the minimum resolution, and the code sequence with respect to each of the sub-bands HL, LH and HH becomes the target at other resolutions. The packet is formed by the packet header and the packet data (packet body). The packet header includes information related to the packet having a length 0, the existence of a code block, the number of 0 bit planes, the number of code paths, and the length of the coded data.

Figure 20:
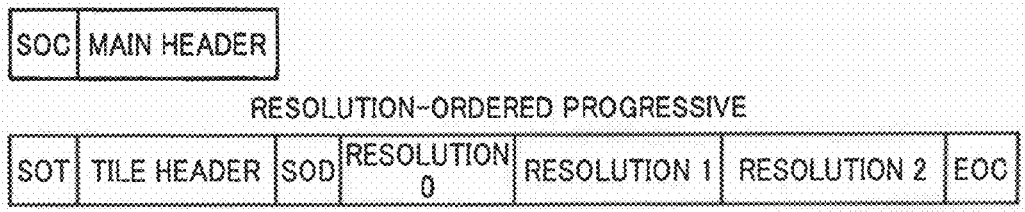
FIG. 20 is a diagram for explaining an RLCP order format.

Under these preconditions, the code of a single layer will be considered for a case where the progressive order is the RLCP order (resolution-ordered progressive) as shown in FIG. 20. FIG. 20 is a diagram for explaining the RLCP order format.

In the case of such a code, the decoder reads the progressive order from the header information, and analyzes the packet according to the following loop.

2 for (resolution) {for (layer) {for (component) {for (precinct) {Analyze packet}}}}

For example, when the value of the tag decomposition level (resolution level) within the header information is rewritten to make it appear as if there is only one resolution level, the value of the resolution in the first "for" loop is set to one within the decoder, and only the packets having the resolution level of up to one is handled. Consequently, it is possible to carry out a partial decoding from the point of view of the resolution.

Similarly, in the case of the LRCP order or the like, the "for" loop is carried out according to the progressive order so that only the packets of up to a predetermined layer are handled. As a result, it is possible to carry out a partial decoding from the point of view of the picture quality. Similarly, the "for" loop may be carried out according to the progressive order so that only the packets of up to a predetermined number of components are handled.

In order to ensure correct partial decoding, the header information which is forcibly rewritten needs to be the number of elements substantially at the highest level (outermost "for" loop in the case described above) of the progressive order and the header information related to the elements. In other words, it is possible to prevent correct decoding if the number of elements not substantially at the highest level of the progressive order or the header information related to the elements are rewritten or, the marker itself indicating the progressive order is rewritten.

Figure 21B:
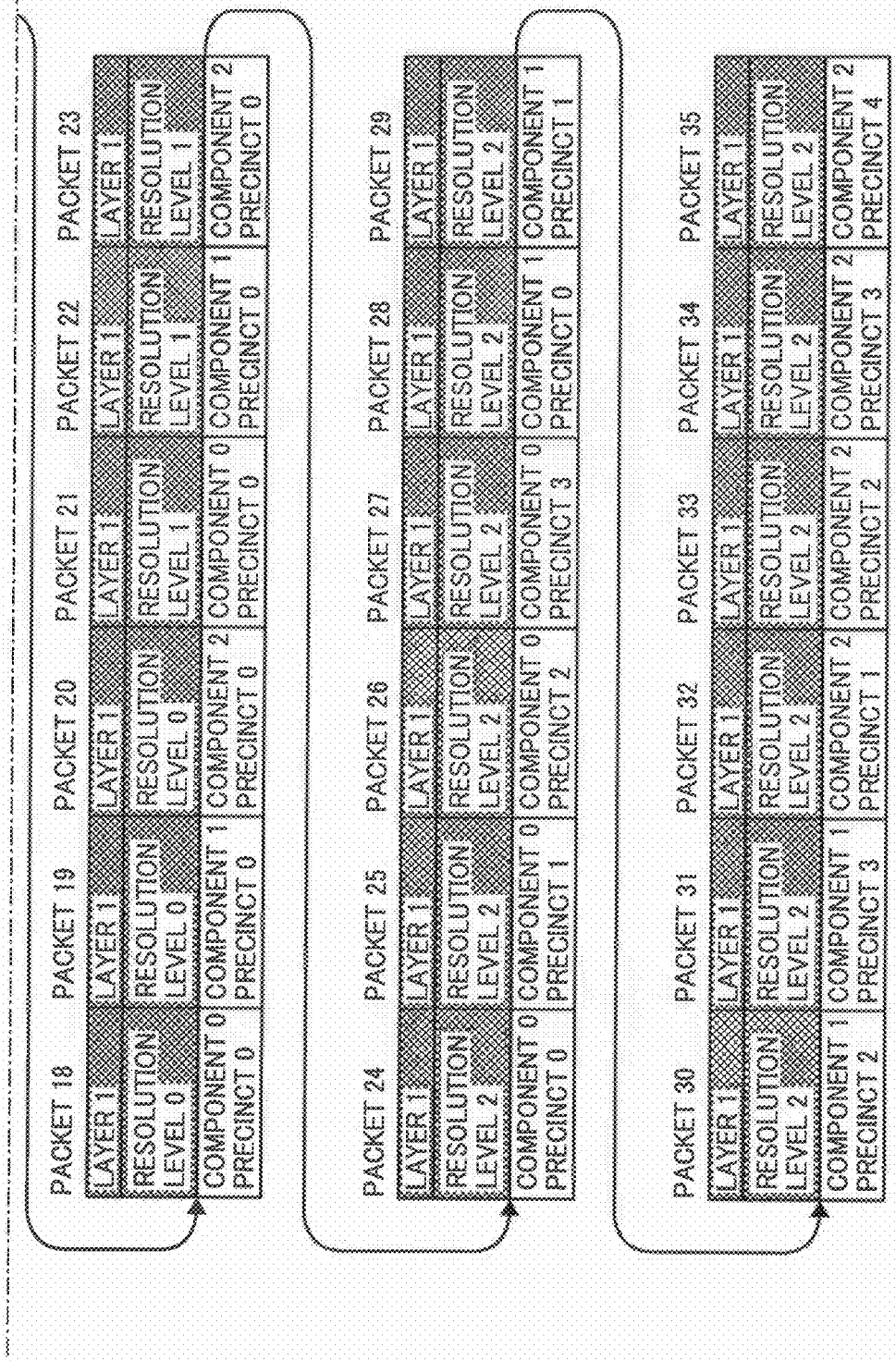
FIG. 21 is a diagram for explaining the permutation of packets corresponding to the analyzing order of the packet.
Figure 22:
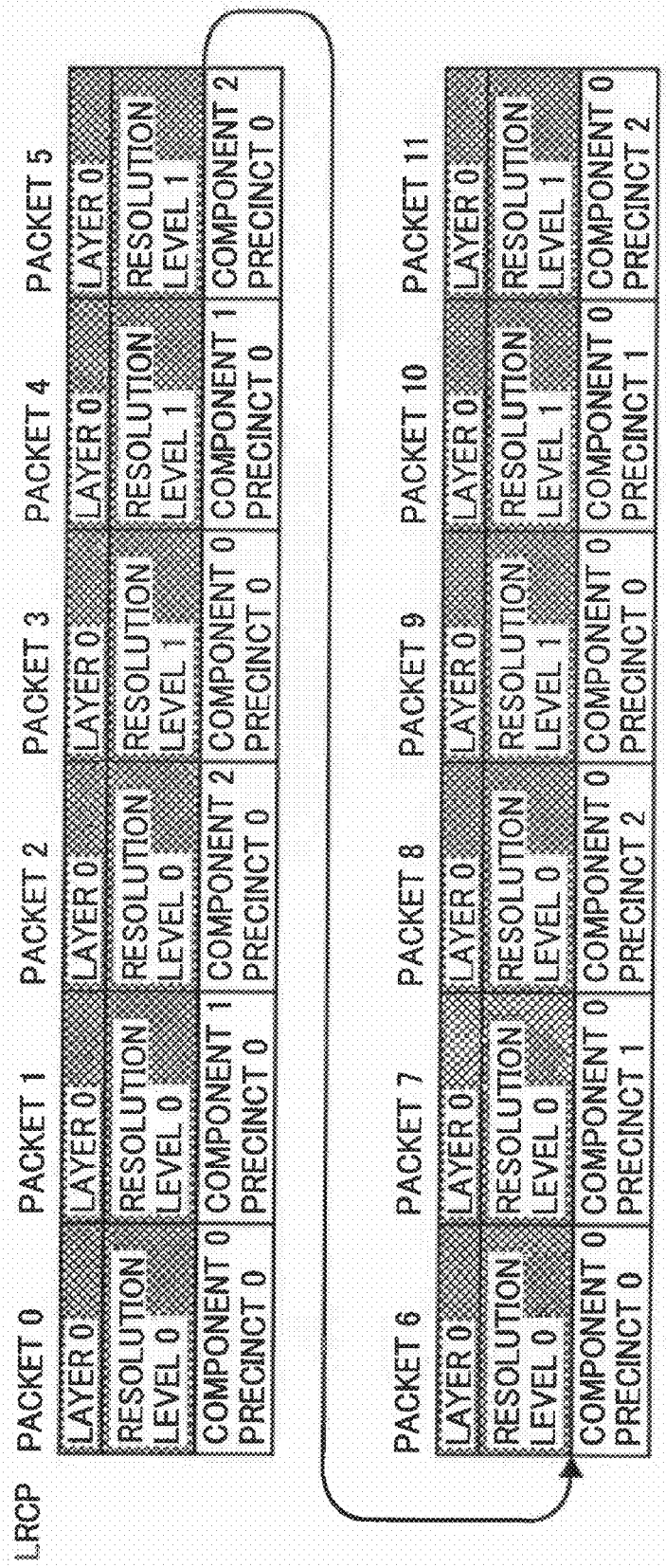
FIG. 22 is a diagram for explaining the permutation of packets corresponding to the analyzing order of the packet in a case where the rewriting of header information does not depend on elements in a highest level of a progressive order.

Next, a more detailed description of the above will be given with reference to FIGS. 21 through 23. FIGS. 21(A)-(B) are a diagram for explaining the permutation of packets corresponding to the analyzing order of the packets. FIGS. 21(A)-(B) show the permutation of 36 packets (the analyzing order of the packets) for a case where the image size is 100.times.100 pixels, there are two layers, the number of resolution levels is 3 (0 to 2), there are three components, the precinct size is 32.times.32 pixels, and the progressive order employed is the LRCP order.

In this state, suppose that the number of resolution levels within the code tag is rewritten to resolution levels 2 (0 to 1), for example. In this case, as may be readily understood from the "for" loop described above, the packets 6 through 11 which should originally have the resolution level 2 are analyzed as the resolution levels 0 to 1 of the layer 0, as shown in FIG. 22. FIG. 22 is a diagram for explaining the permutation of packets corresponding to the analyzing order of the packets in the case where the rewriting of header information does not depend on elements in the highest level of the progressive order.

Figure 23B:
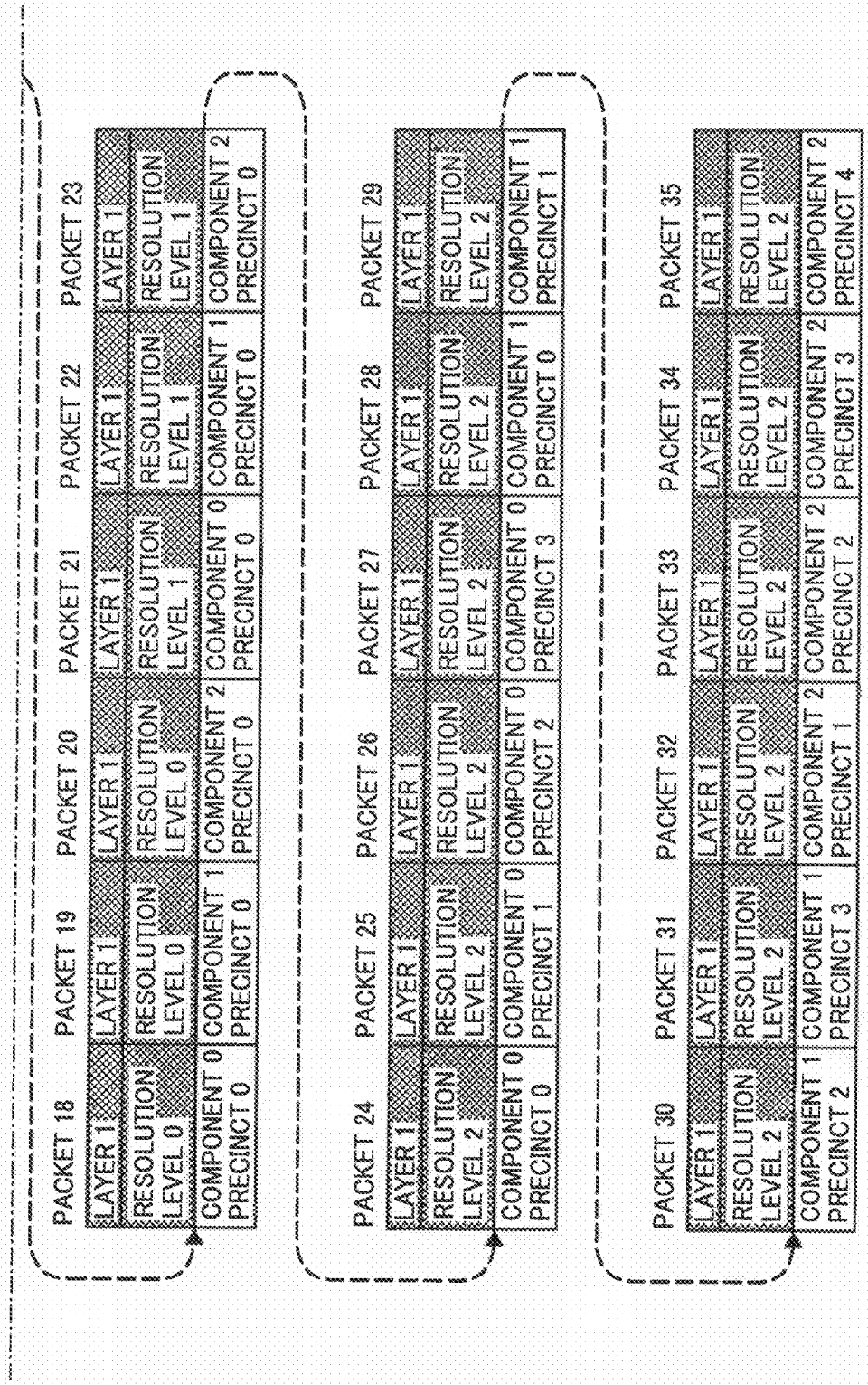
FIG. 23 is a diagram for explaining the permutation of packets corresponding to the analyzing order of the packet in a case where the rewriting of header information depends on elements in a highest level of a progressive order.

Therefore, in order to correctly carry out the partial decoding, the header information which is rewritten needs to be the number of elements substantially at the highest level (outermost "for" loop in the case described above) of the progressive order, and the header information related to the elements. The target is the layer in the case shown in FIG. 21, and when the number of layers within the code tag is rewritten to 1, for example, the order of the packets become as shown in FIGS. 23(A)-(B). FIGS. 23(A)-(B) show diagrams explaining the permutation of packets corresponding to the analyzing order of the packets in a case where the rewriting of header information depends on the elements in the highest level of the progressive order. In FIGS. 23(A)-(B), the decoding ends at a part indicated by "END", and the decoding of portions indicated by the dotted lines is skipped, so that the packets are analyzed correctly.

As described above, the image is divided into the "tiles", but in addition to the progressive order described above, a loop related to the tile also exists. Although not in the JPEG2000 standard specifications (and at the discretion of the user), the decoder normally takes the following structure.

3 while (as long as tile exists) for (resolution) {for (layer) {for (component) {for (precinct) {analyze packet}}}}}

And as described above, the tile number is written in the SOT tag of the header, and the tile size and the image size are written in the SIZ tag. Accordingly, when the image size of the header information is rewritten to 1/2, the decoder normally judges that a number of tiles within the range of the image size of 1/2 exist and attempts to decode only the codes of the tiles having the tile numbers within the above number, although dependent on the structure of the decoder. As a result, the partial decoding is also possible in this case.

An embodiment of the code conversion apparatus, the code conversion method and the computer-readable storage medium according to the present invention utilizes the decoding characteristic which accompany the wavelet inverse transform of the JPEG2000. With respect to the target code, only the header information is rewritten, and the editing is made in the coded state, to thereby enable the partial decoding.

Figure 24:
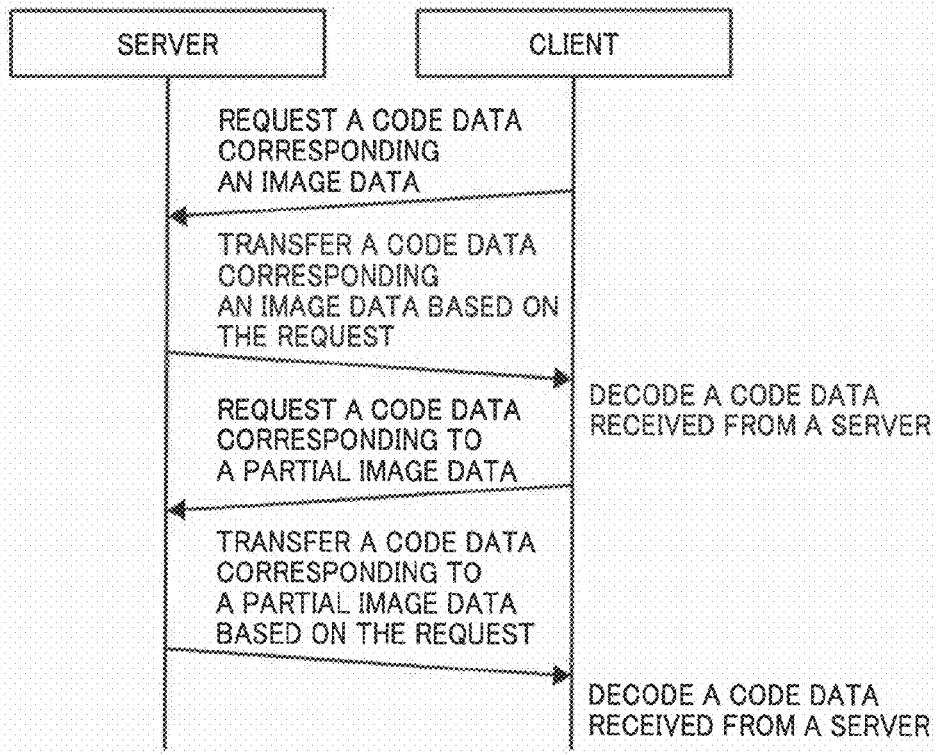
FIG. 24 is a diagram for explaining outline of a protocol between a server and a client.

FIG. 24 is a diagram for explaining outline of a protocol between a server and a client. The client sends a request of a code data to the server. The server transmits the code data of an image data to the client after receiving the request. The client decodes the code data, and displays an image data. The user specifies the partial image of the image data, and requests the transmission of the code data corresponding to the specified partial image data. After the server received the request from the client, the server sends a code data corresponding to the specified partial data to the client. The client reproduces an image data after decoding the code data. The client in the JPIP can identify a partial code data that is received from the server. In addition, the client can display an image data by decoding the code data.

Figure 25:
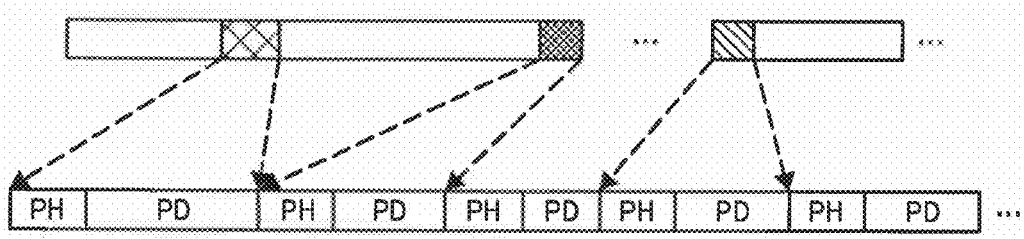
FIG. 25 is a diagram for explaining a relationship of a JPEG2000 file and a data BIN.

FIG. 25 is a diagram for explaining a relationship of a JPEG2000 file and a data BIN. In this invention, a packet includes the data BIN. The packet contains information that shows whether to belong to a data of each hierarchy or not. For example, the packet is shown that a tile is "A", the component is "Cb", the position is "4", and the resolution level is "1".

Figure 26:
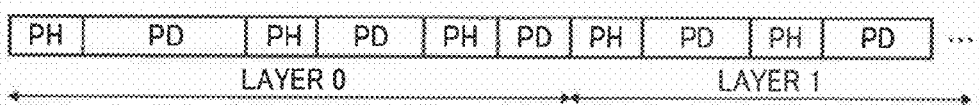
FIG. 26 shows a precinct data BIN that is composed of a packet header (PH) and a packet data (PD)

FIG. 26 shows a precinct data BIN that is composed of a packet header (PH) and a packet data (PD). The packet header includes information which is the number of bytes stored in each code data or the number of a coding propagations in each code data.

Next, it is explained a server and a client via network in the JPIP. FIG. 27 is a diagram for explaining a client server system that has cache in the JPIP.

Figure 27A:
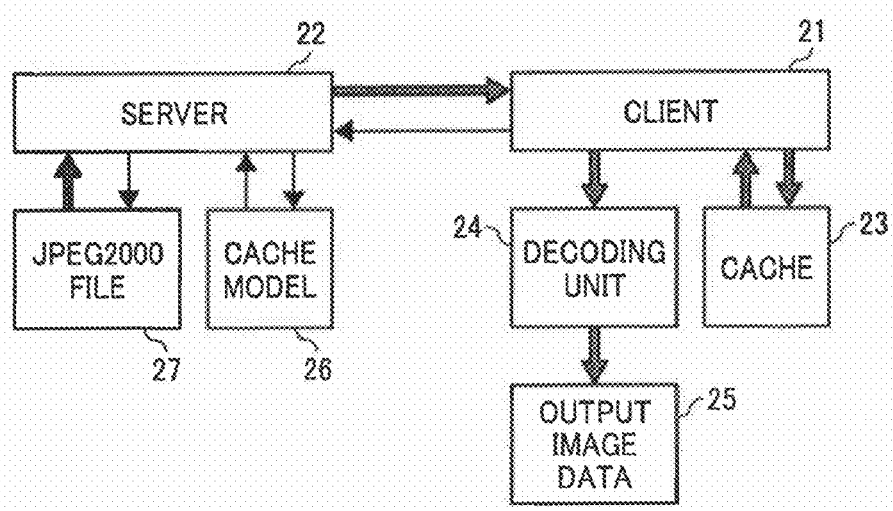
FIG. 27 is a diagram for explaining a client server system that has cache in the JPIP.

A server 22 is coupled to at least client shown in FIG. 27(A). The server 22 stores a code data which is JPEG2000 file 27. For example, the client is a client 21. The client 21 requests a code data corresponding to a certain image data to the server 22. In addition, the client 21 received the code data based on the request from the server 22. The client 21 requests a code data corresponding to a different part of image data to the server 22. In addition, the client 21 receives a code data based on the request from the server 22. The client 21 output the code data to a decoding unit 24. The decoding unit generates an output image data 25 from the code data. The code data received from the sever 22 is different from a code data received in the past. Because the code data received in the past is stored in the cache 23.

A feature of the JPIP is not to request a code data again that the client 21 has already received it. The JPIP has two methods on this point. First, A client 21 has information regarding to receiving a code data in the past shown in FIG. 27(A). If a client 21 has the information, a client 21 does not need to request a code data a client 21 have already received. Second, a server 22 has a cache model 26. The cache model 26 stores a code data which is transmitted to a client 21 shown in FIG. 27(A). The cache model 26 in the server 22 stores a history information of transmitting a code data. The client 21 stores a code data received from the server 22 in a cache 23. The server 22 requests the code data without transferring a code data that has already been transmitted to the client 21. For example, the client 21 sequentially stores JPEG2000 code data received from the server 22 in the cache 23. In addition, the client 21 generates a bit stream that confirms to the standards of the JPEG2000 from the code data stored in the cache 23.

Figure 27B:
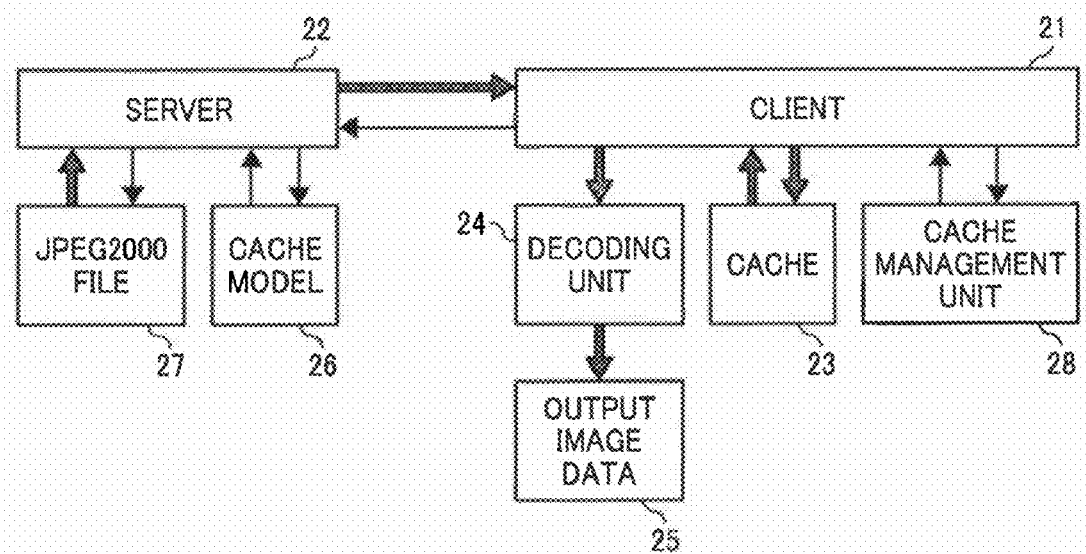

FIG. 27(B) shows that a cache management unit 28 was added to the composition shown in FIG. 27(A). The cache management unit 28 manages a cache data in the cache 23. The client 21 can change a code data corresponding to part of interesting image by an interrupt processing before receiving all of a code data according user's request.

Figure 28A:
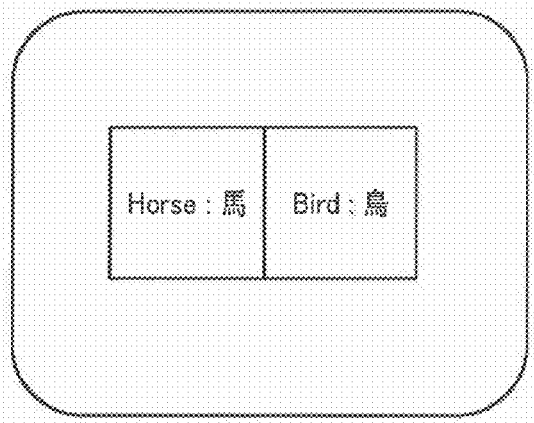
FIG. 28(A) and FIG. 28(B) are examples of the output display where the JPIP is used.
Figure 28B:
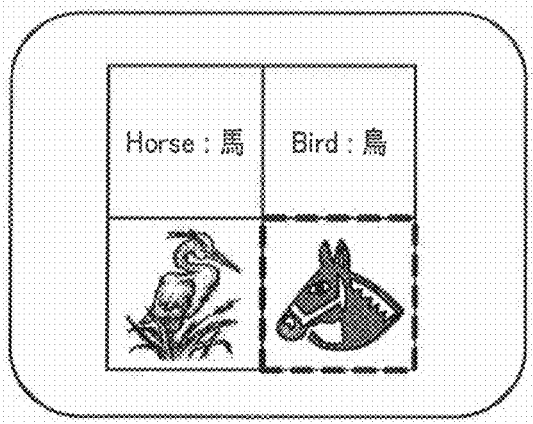
Figure 28C:
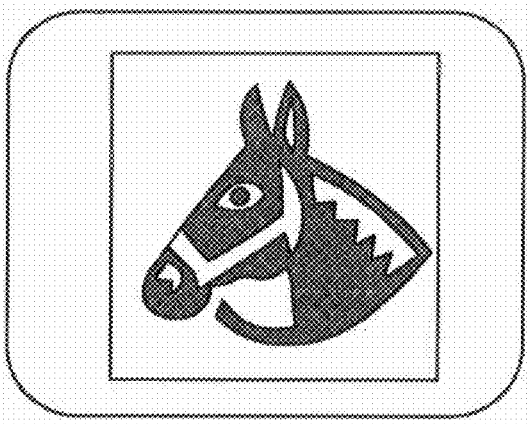

FIG. 28(A) and FIG. 28(B) are examples of the output display where the JPIP is used. FIG. 28(A) shows that an image data composed of two tiles is displayed on the screen, and the user can select one of two tiles. FIG. 28(B) shows that the image data changes an image data composed of four tiles that are inferior in an image quality. FIG. 28(C) shows that a resolution of a partial tiles clicked by user is transformed. As a result, an image quality level of the tiles improves. Thus, the client 21 needs the partial code data in the JPIP.

FIG. 29 is an example of a document data composed of the image data of three objects. A document data is divided into an image data of plural independent objects. In addition, the divided data is encoded independently. As a result, a code data with multi object compositions is generated by the encoding processing. The code data is independently decoded in each object. Finally, a document data is reproduced by synthesizing plural objects. In this specification, one object is described as a single object, and plural objects have been described as a multi object.

Figure 30:
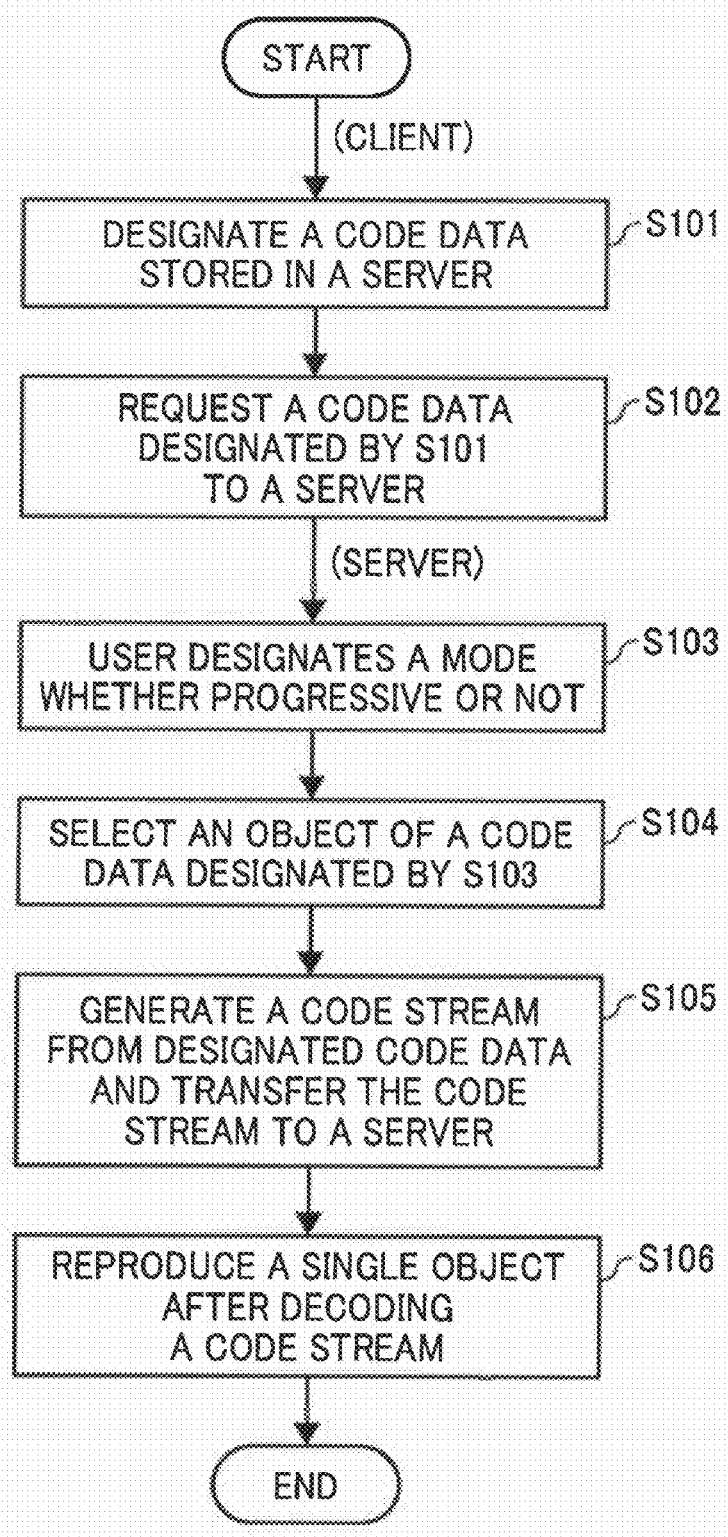
FIG. 30 is a flow diagram of an exemplary system in this invention.

FIG. 30 is a flow diagram of a system in this invention. The system processes each object, when the system reproduces an image data from a code data with a multi object.

Step 101 shows that a client designates a code data stored in a server. Step 102 shows that a client requests a code data designated by Step 101 from a server. Step 103 shows that user designates a mode which is selected whether progressive or not. Step 104 shows that a server selects an object of a code data designated by user. Step 105 shows that a server selects a code data corresponding to an object designated by user. Step 105 shows that a server generates a code stream from designated code data and transfers the code stream to a client. Step 106 shows that a client decodes the code stream. As a result, a client reproduces a single object.

Figure 31:
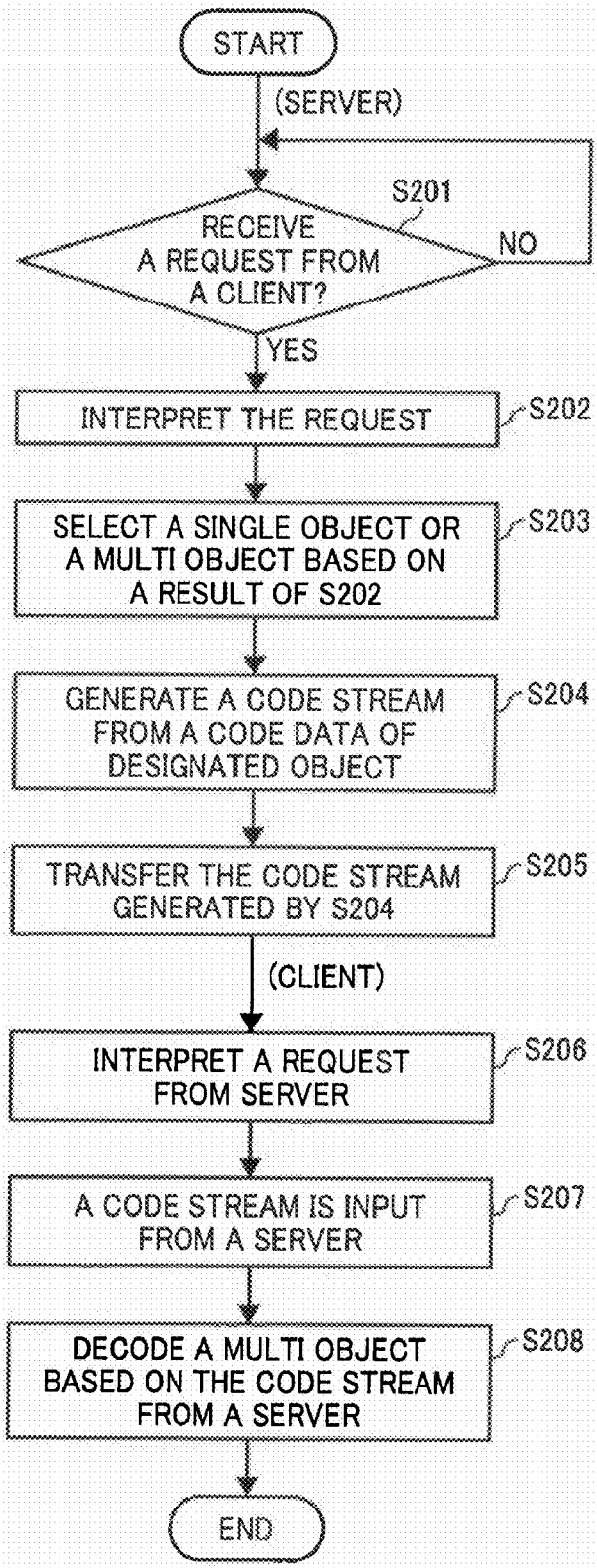
FIG. 31 is a flow diagram of a system that selects JPM object in the JPIP.

FIG. 31 is a flow diagram of a system that selects JPM object in the JPIP. Step 201 shows that a server receives a request from a client. If a server receives a request, it shifts to Step 201 YES. Step 202 shows that a server interprets the request. Step 203 shows that a server selects a single object or a multi object based on the result of Step 202. Step 204 shows that a server generates a code stream from the code data of designated object. Step 205 shows that a server transfers the code stream generated by Step 204 to a client. Step 206 shows that a client interprets a request from a server. Step 207 shows that a code stream is input from a server. Step 208 shows that a client decodes a multi object based on the code stream from a server.

Figure 32:
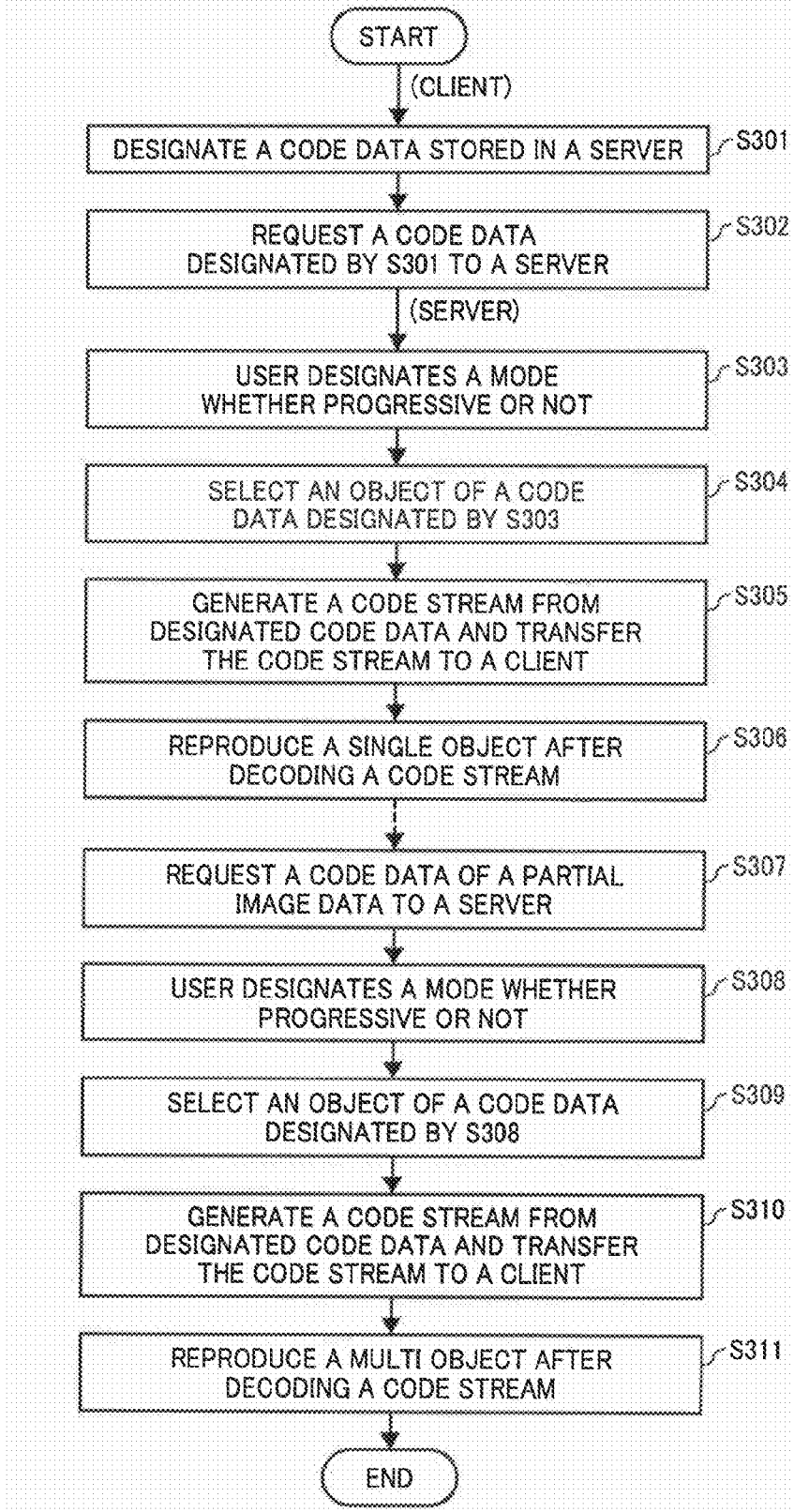
FIG. 32 is a flow diagram of a system in another non-limiting embodiment of the present invention.

FIG. 32 is a flow diagram of a system in another embodiment. FIG. 32 is a composition that a code data of the multi object in all areas or a partial area of an image data is reproduced after reproducing an image data of a single object. Step 301 shows that a client designates a code data stored in a server. Step 302 shows that a client requests a server to reproduce at least a partial code data of an object. Step 303 shows that user designates a mode which is selected whether progressive or not. Step 304 shows that a server selects a code data of an object designated by user. Step 305 shows that a server generates a code stream from designated code data and transfers the code stream to a client. Step 306 shows that a client decodes the code stream. As a result, a client reproduces a single object. Step 307 shows that a client requests a code data of a partial image data to a server. Step 308 shows that user designates a mode which is selected whether progressive or not. Step 309 shows that a server selects a code data of an object requested by the client. Step 310 shows that a server generates a code stream from designated code data and transfers the code stream to a client. Step 311 shows that a client decodes the code stream. As a result, a client reproduces a multi object.

Figure 33:
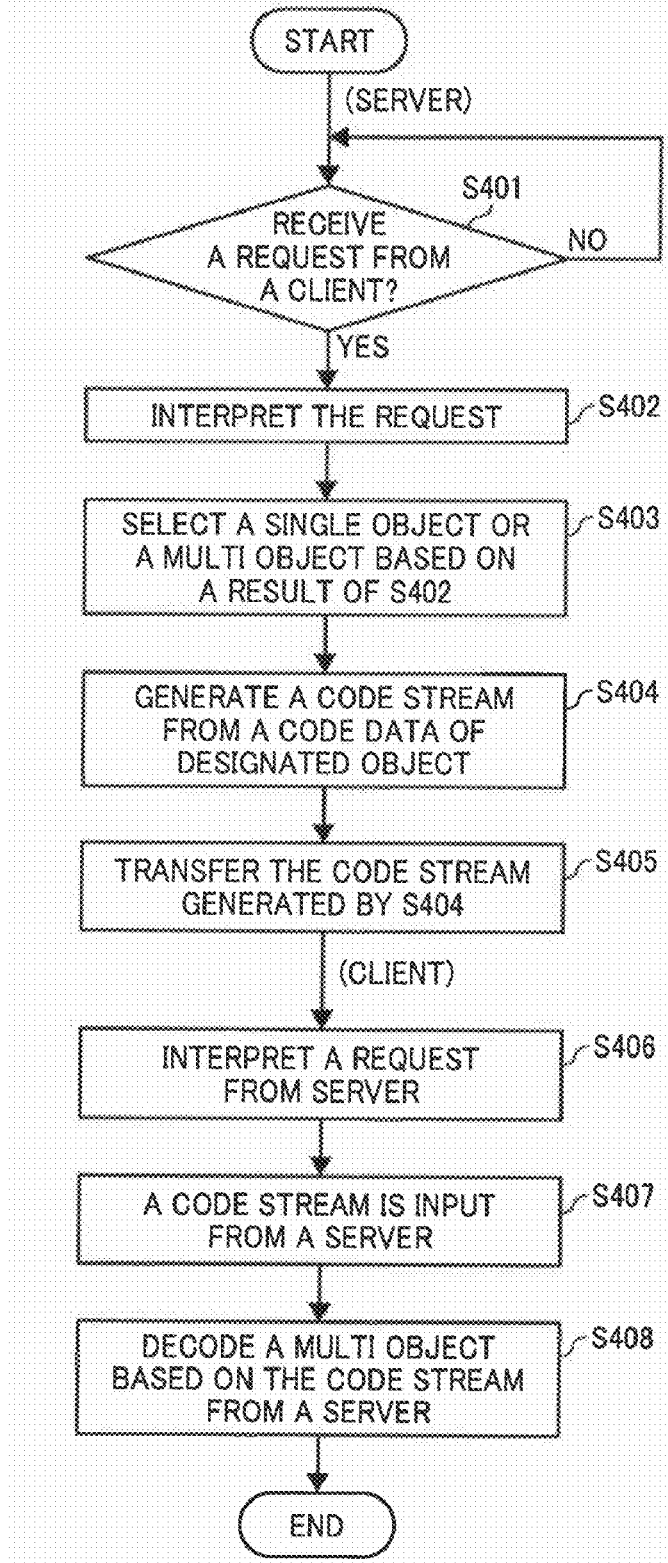
FIG. 33 is an example of selecting JPM object in the JPIP.

FIG. 33 is an example of selecting JPM object in the JPIP. Step 401 shows that a server receives a request to transfer a code data to a client. Step 402 shows that a server interprets the request received from a client. Step 403 shows that a server selects an object based on the result of Step 402. Step 404 shows that a server generates a code stream from the code data of designated object. Step 405 shows that a server transfers the code stream generated by Step 404 to a client. Step 406 shows that a client interprets a request from a server. Step 407 shows that a code stream is input to a client. Step 408 shows that a client decoded a multi object based on the code stream from a server.

Figure 34:
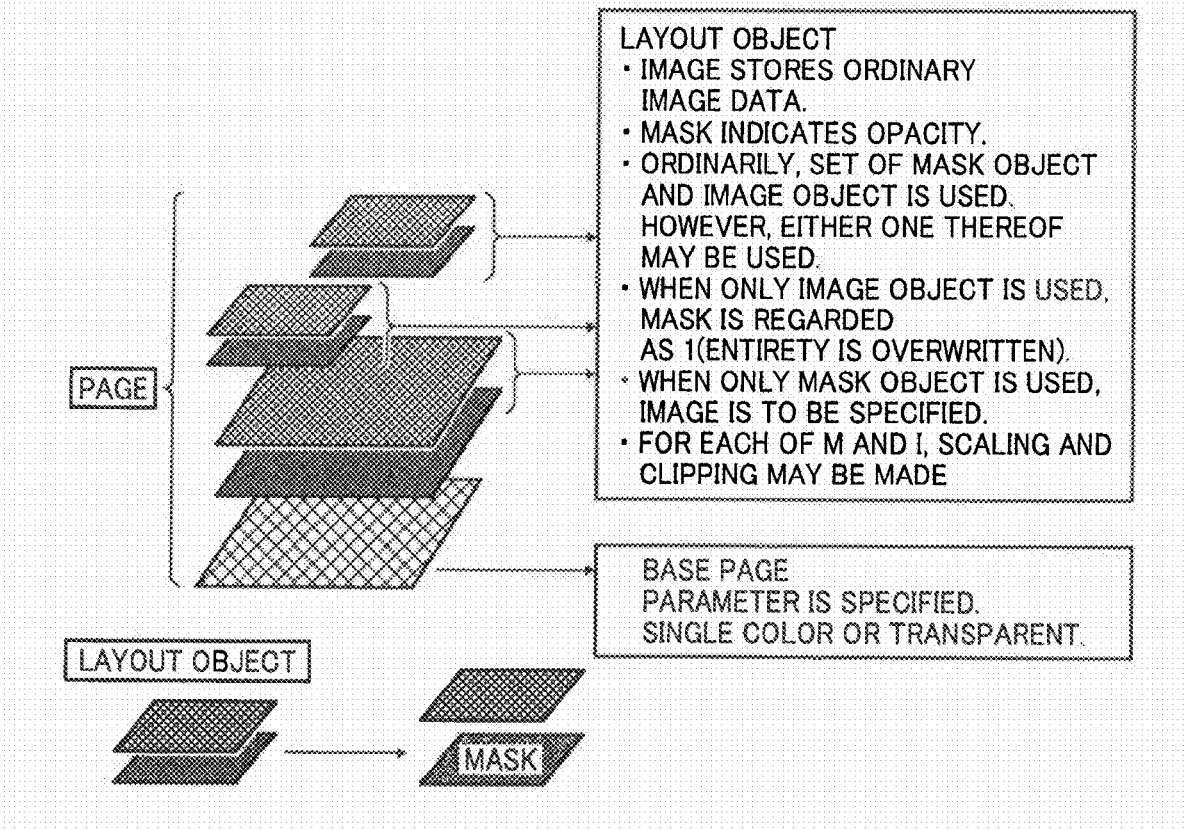
FIG. 34 illustrates an outline of JPM.

FIG. 34 illustrates an outline of JPM. A page of a document includes at least one set of a layout object and a base object (background). The base object includes parameter specification, and, ordinarily, a single color or transparent. The layout object includes an image (foreground) and a mask. The image stores ordinary image data. The mask indicates opacity. Ordinarily, the layout object includes sets of images and masks. However, the layout object may be one which includes only either one. When the layout object includes only images, all the masks are regarded as "1", which means 'overwriting'. When the layout object includes only marks, the images have values to specify. It is noted that scaling and clipping can be made on either one of image and mask (see FIG. 36).

Figure 35:
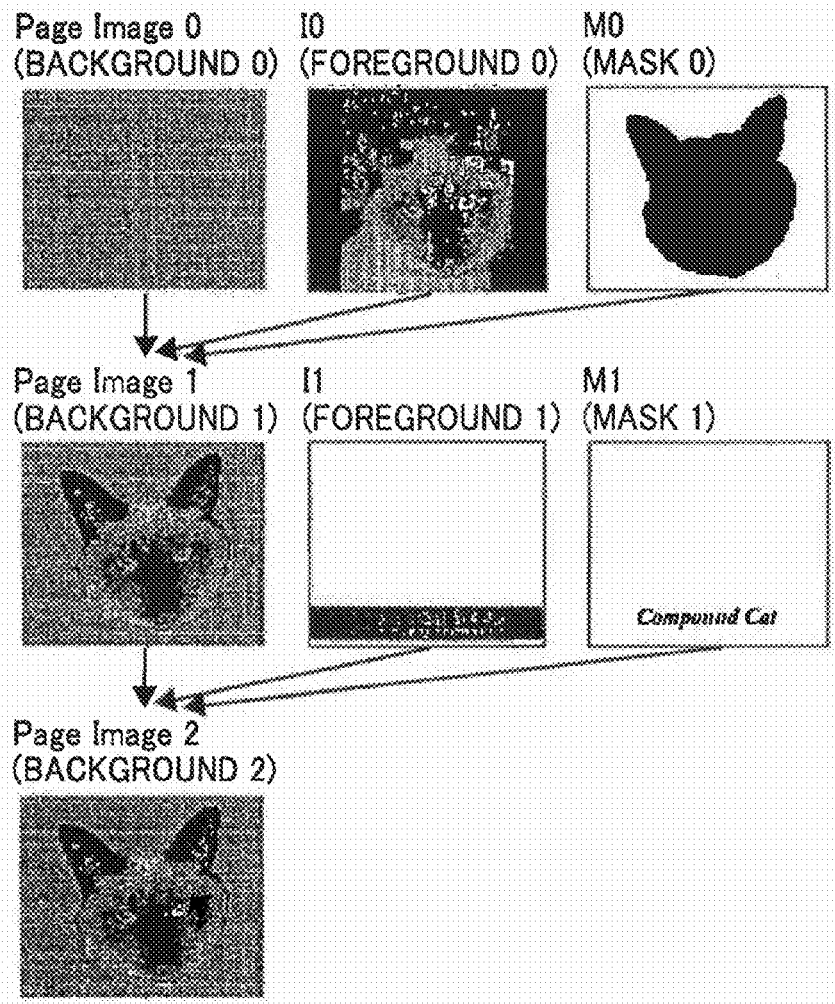
FIG. 35 illustrates an example of page image reproduction of the JPM structured document.
Figure 36A:
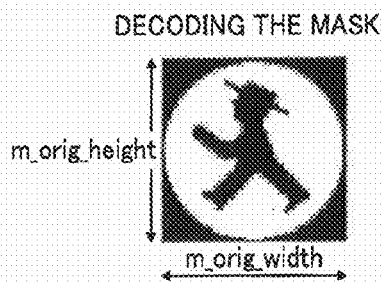
FIG. 36 is example of scaling and clipping that can be made on either one of image and mask.
Figure 36B:
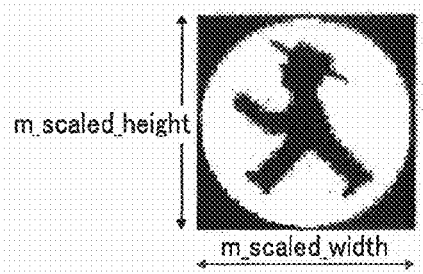
Figure 36C:
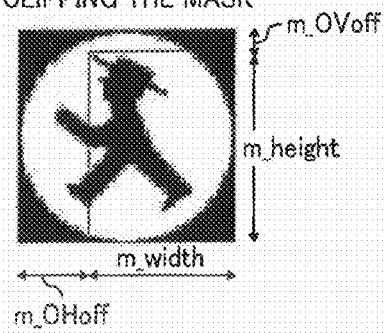
Figure 36D:
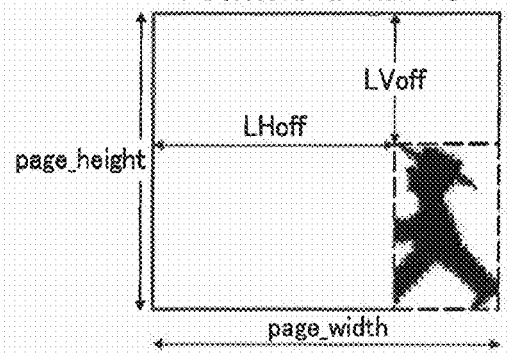
Figure 36E:
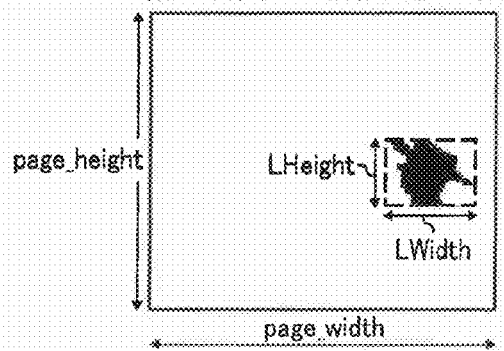

FIG. 35 illustrates an example of page image reproduction of the JPM structured document. In a lower part of FIG. 35, arithmetic expressions for image reproduction are shown.

First, the base page is PageImge_0 (background 0). Then, PageImage_1 is produced from PageImge_0 and Image_0 (foreground 0) and Mask_0 (mask 0) of the first layout object. That is, the opacity is 1 at a black pixel position of Mask_0, and Image_0 is overwritten on PageImge_0. At a white pixel position of Mask_0, the transparency is 1, and thus, PageImge_0 is displayed. Similarly, PageImge_2 (background 2) is produced from PageImage_1 (background 1), as well as Image_1 (foreground 1) and Mask_1 (mask 1) of the second layout object. Thus, Image_1 is overwritten at the black pixel position of Mask_1 on PageImage_1, while PageImge_1 is displayed at the while pixel position of Mask_1. In this example, PageImage_2 is the reproduced image finally displayed.

The second expression shown in the lower part of FIG. 35 is the arithmetic expression for blending background and foreground. Mm and Im denote the mask pixel value in the m-th layout object and the image (foreground) pixel value, respectively. 'c' denotes the component. Mask is of a single component. [x,y] denotes the pixel coordinate, and Sm denotes the Mm's maximum value ((power of 2)-1). 'n' denotes the number of layout objects.

The above-mentioned second arithmetic expression is further described. In the example of FIG. 35, the mask has a binary value (one bit for each pixel). Thus, $Sm=2^1-1=1$. Accordingly, when the mask value is 1, the combined image value=the foreground value. When the mask value is 0, the combined image value=the background value. That is, either one of the foreground value and the background value is selected by the mask value. However, the mask may have a multilevel value. That is, when each pixel of the mask has an 8-bit positive value (including 0), $Sm=2^8-1=255$. Accordingly, in this case, the combined pixel value=((255−mask value)/255)×background value+(mask value/255)×foreground value. Thus, a value obtained from 'weighted averaging' of the foreground value and the background value becomes the combined image value. Thus, the mask has a function of controlling a display ratio between the foreground and the background.

Next, the mask scaling and clipping are described with reference to FIG. 36. A decoded mask (see FIG. 36, (a)) can be changed in size separately in a vertical direction and in a horizontal direction (see (b)). When only a part of the mask is used, the part of the mask should be clipped out (see (c)). Then, the thus-clipped-out part of the mask may be allocated at any position of the page (see (d)). The mask part may further be subject to clipping after the allocation (see (e)). Also as to the foreground, the scaling/clipping can be made in the same manner.

Thus, from a structured document code, including 'background and at least one set of foreground and mask' (when only one set of foreground and mask is included, it including 'background, foreground and mask'), a document image can be reproduced in the above-described procedure.

Figure 37A:
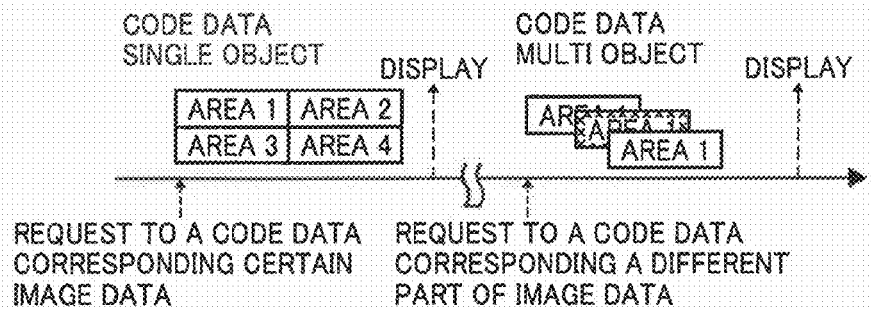
FIG. 37(A), FIG. 37(B) and FIG. 37(C) are examples of processing a JPM object progressively.
Figure 37B:
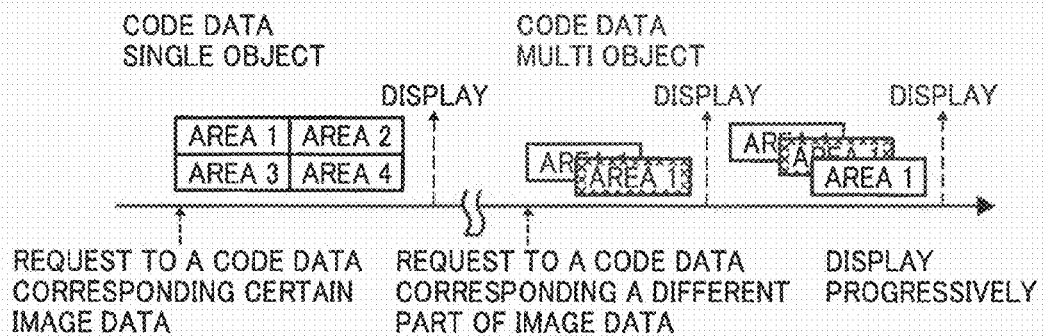
Figure 37C:
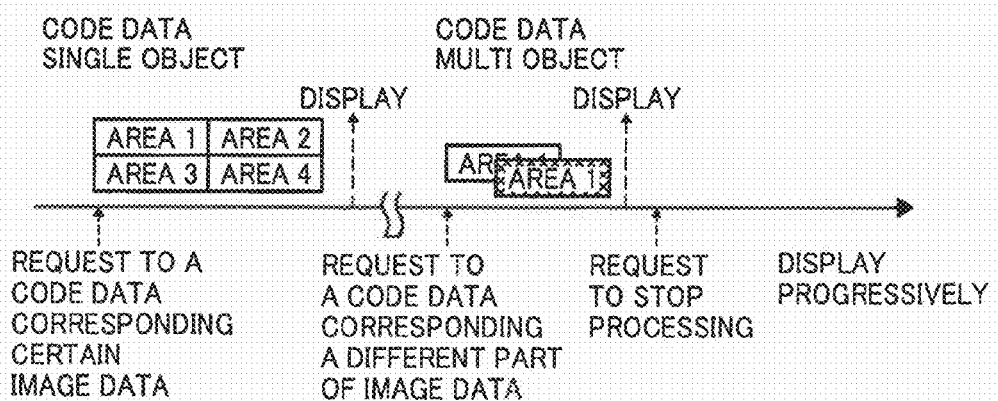

FIG. 37(A), FIG. 37(B) and FIG. 37(C) are examples of processing a JPM object progressively. FIG. 37(A) shows that a JPM object is not reproduced progressively. First, an image data of a single object is reproduced. Second, an image data of a multi object that is a partial area or all areas is reproduced. A client requests a code data to a server. In addition, a server transfers the code data based on the request from the client. Finally, a client decodes the code data received from the server. In this example, the image data is encoded in each block.

FIG. 37(B) shows that a partial code data is reproduced progressively. First, an image data of a single object is reproduced. Second, an image data of a multi object that is a partial area or all areas is reproduced progressively.

FIG. 37(C) shows that a client process interrupts a server, when running out of time. The server can receive a request from the client on the way of processing. As a result, when the user determines an image data to be unnecessary, processing can be interrupted.

Figure 38:
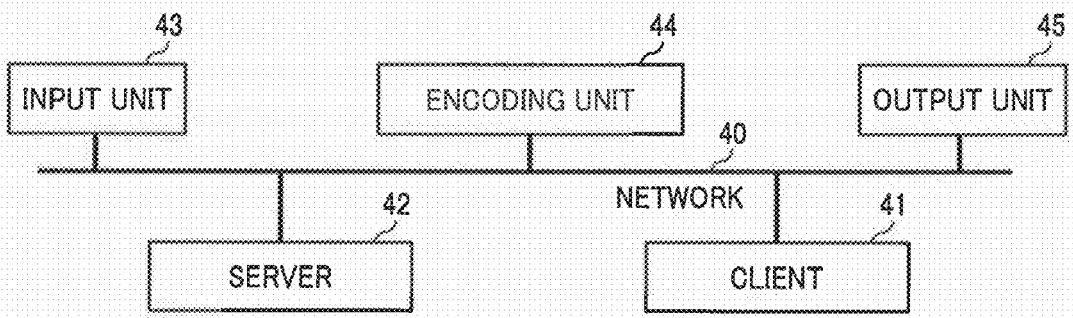
FIG. 38 is a diagram for explaining a system which processes progressively.

FIG. 38 is a diagram for explaining system which processes progressively. The system includes a network 40, a client 41, a server 42, an input unit 43, an encoding unit 44 and an output unit 45. The client 41 generates a document data from a code data. The server 42 stores a code data generated by the encoding unit 44. The input unit 43 inputs a document data. The encoding unit 44 receives the document data from the input unit 43 via the network 40. In addition, the encoding unit 44 encodes the document data and transfers the code data to the server 42. The output unit 45 outputs the document data generated by the client 41. The document data generated by the client is transferred to the output unit 45. In addition, the system has a display unit (not shown in FIG. 38). The display unit displays the document data.

Figure 39:
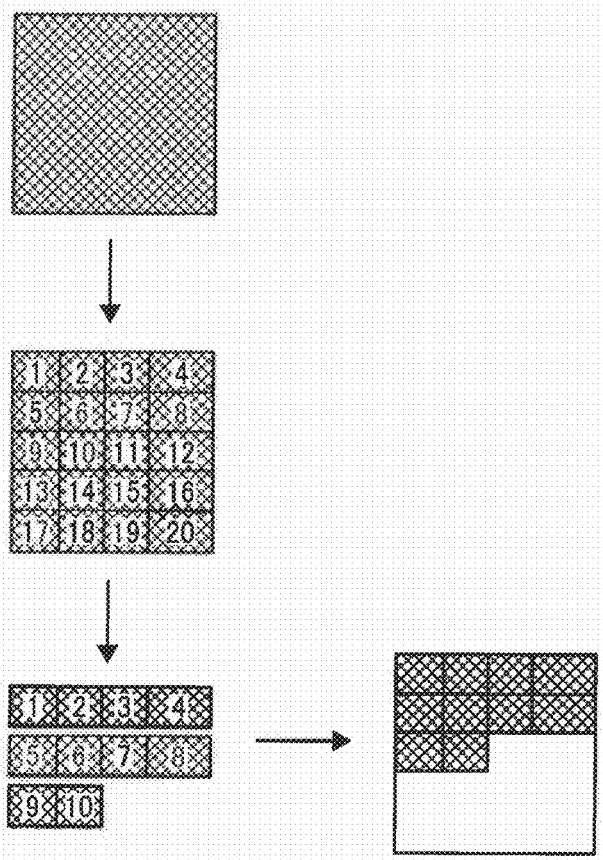
FIG. 39 is a diagram for explaining of processing in each code data corresponding to image area progressively.

FIG. 39 is a diagram for explaining of processing in each code data corresponding to image area progressively. A code stream is generated from the code data in each area that division is easy shown in FIG. 39.

Figure 40:
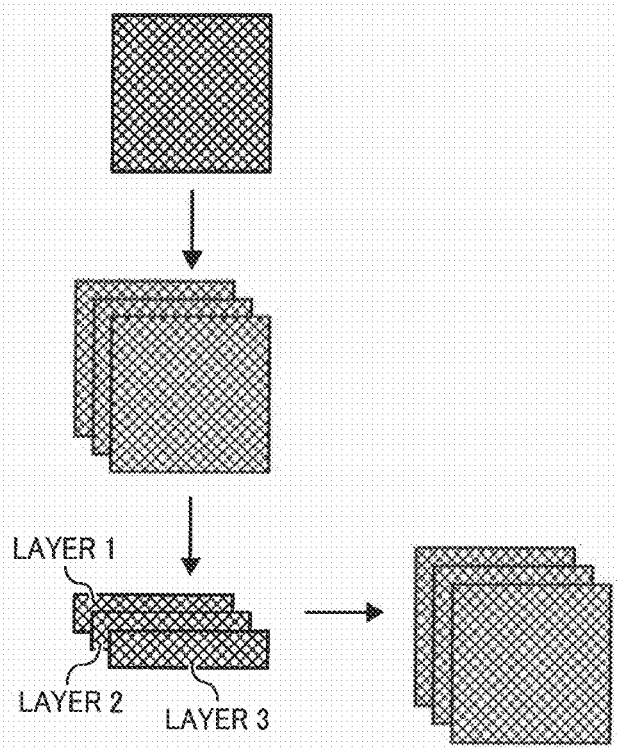
FIG. 40 is a diagram for explaining of processing in each code data corresponding to layer progressively.

FIG. 40 is a diagram for explaining of processing in each code data corresponding to layer progressively. A code stream is generated from the code data in each layer that division is easy shown in FIG. 40. The JPEG2000 can generate both of the code streams because of having scalable layered structure. If the code data corresponding to the image area is processed progressively in each area, the code data is decoded in each area. Such processing shown in FIG. 39 is suitable for the printer. If the code data corresponding to the layer is processed progressively in each layer, the code data is decoded in each layer. Such processing shown in FIG. 40 is suitable for the display device.

Figure 41:
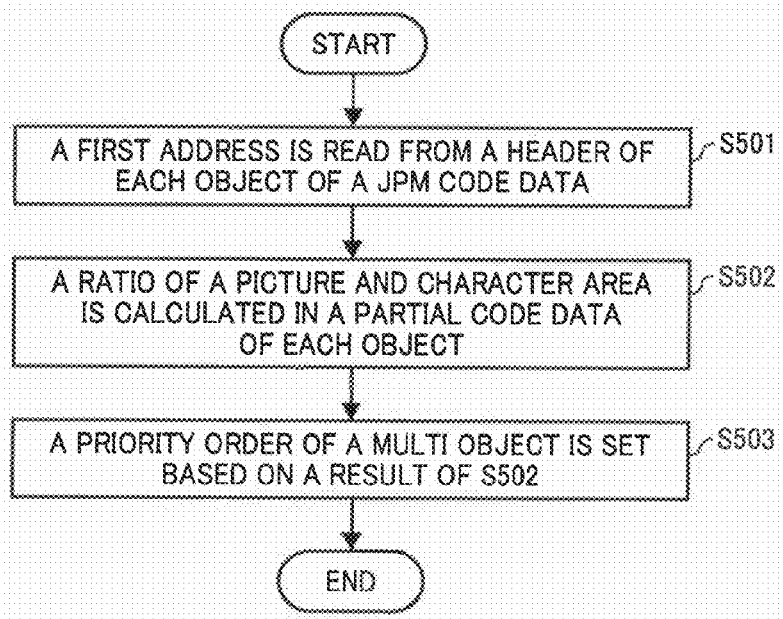
FIG. 41, FIG. 42 and FIG. 43 are flow diagrams of setting a priority order of an object.

In reproducing progressively, it is preferable to reproduce from the image with a high importance sequentially. FIG. 41, FIG. 42 and FIG. 43 are flow diagrams of setting a priority order of an object. The priority order is written and stored in a header of a code data. A server can recognize the priority order by referring to the header of the code data.

Step 501 shows that a first address is read from a header of each object of a JPM code data. Step 502 shows that a ratio of a picture and character area is calculated in a partial code data of each object. Step 503 shows that a priority order of a multi object is set based on a result of Step 502.

Next, it is explained a technique used to Step 502. An extraction of character area is achieved to analyze an image data after a binary processing is given to an image data. For example, the binary processing is disclosed in Japanese Patent Laid-open No. 2002-77631. In addition, the extraction of character area is disclosed in Japanese Patent Laid-open No. 2002-77631. The ratio of a picture and character area can be calculated by detecting the ratio of the picture and the character included in the image data.

Figure 42A:
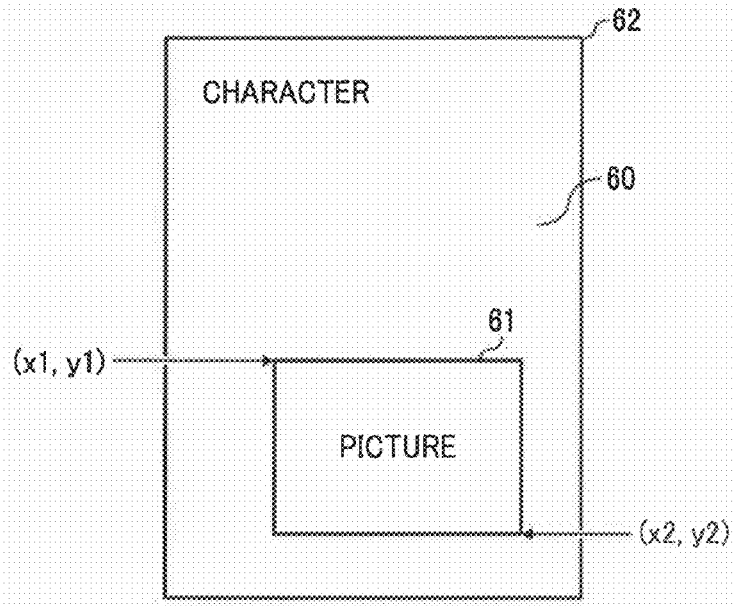
Figure 42B:
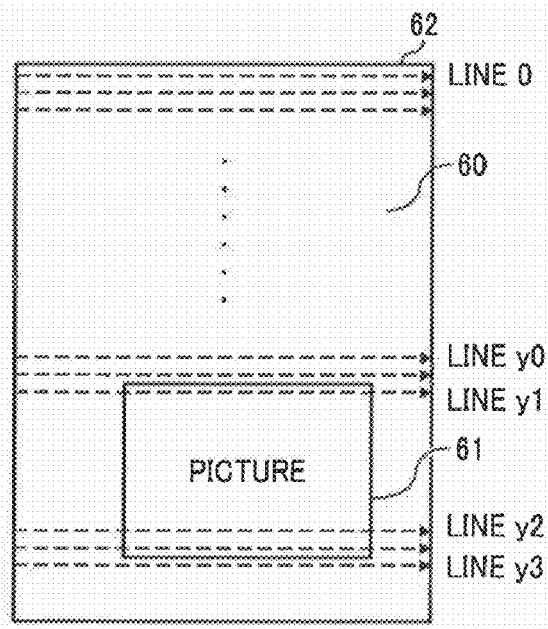
Figure 43:
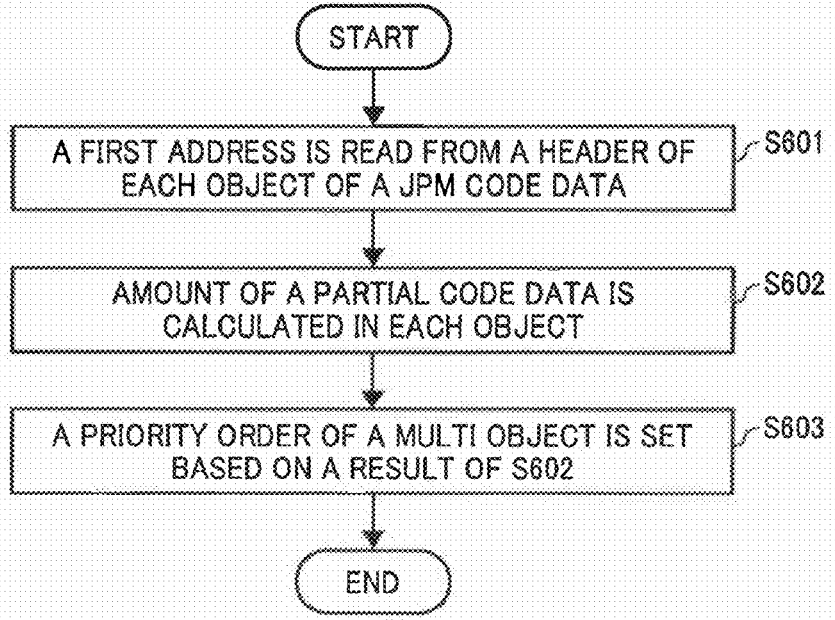

For example, FIG. 42(A) shows that an image data includes a character area and a picture area. In this case, the image data is divided into raster lines y0, y1 and so on shown in FIG. 42(B). In addition, the number of the character on a picture is counted in each raster line.

FIG. 43 is a flow diagram for explaining the setting of a priority order based on amount of a code data. Step 601 shows that a first address is read from a header of each object of a JPM code data. Step 602 shows that amount of a partial code data is calculated in each object. Step 603 shows that a priority order of a multi object is set based on a result of Step 602.

Figure 44:
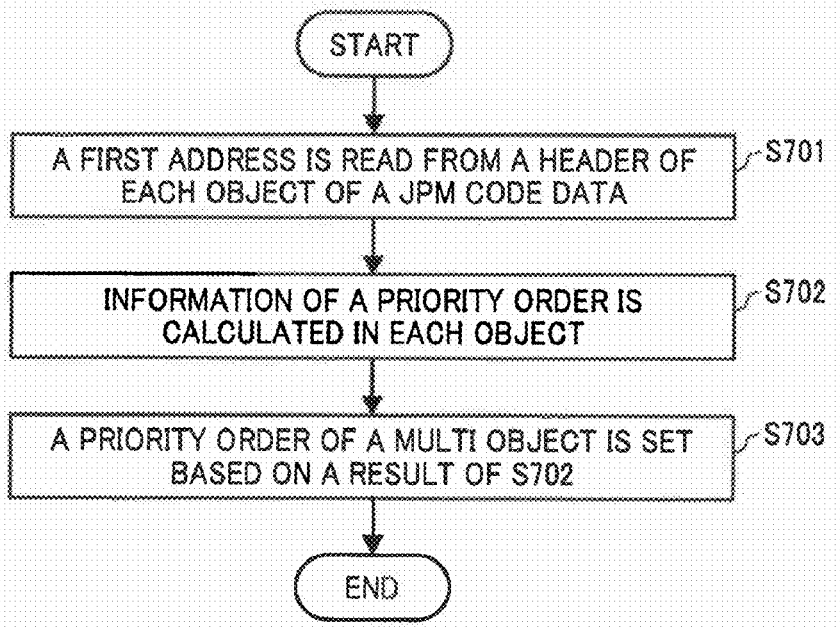
FIG. 44 is a flow diagram for explaining the setting of a priority order based on information of a priority order.

FIG. 44 is a flow diagram for explaining the setting of a priority order based on information of a priority order. Step 701 shows that a first address is read from a header of each object of a JPM code data. Step 702 shows that information of a priority order is calculated in each object. Step 703 shows that a priority order of a multi object is set based on a result of Step 702. A priority order in each object might be set by user shown in FIG. 44.

In addition, FIG. 45 is a flow diagram for explaining the setting of a priority order based on a structure of an image data. Step 801 shows that a first address is read from a header of each object of a JPM code data. Step 802 shows that an identification data is extracted whether a value of a mask data is all "1" or all "0". Step 803 shows that it is determined that whether a value of a mask data is all "0" or not. If a value of a mask data is all "0", it shifts to Step 803 Yes. If a value of a mask data is not all "0", it shifts to Step 803 No. Step 804 shows that a single object of a code data that is a background image data is selected. Step 805 shows that it is determined that whether a value of a mask data is all "1" or not. Step 806 shows that a single object of a code data that is a foreground image data is selected. Step 807 shows that a single object of a code data that is a background image data is generated. A priority order in each object might be set based on a mask image data which composes an object by user shown in FIG. 44.

FIG. 46 is a flow diagram for explaining of decoding progressively in multi page. Step 901 shows that it is determined that whether a first code stream was input or not. If a first code stream is input, it shifts to Step 901 Yes. Step 902 shows that a first code stream is input. Step 903 shows that a first code stream is decoded. Step 904 shows that a first image data is generated by Step 903 is stored. Step 905 shows that a first image data is displayed. Step 906 shows that it is determined whether a second code stream is input or not. If a second code stream is input, it shifts to Step 906 Yes. Step 907 shows that if there are other code streams, exclusive of the already decoded first code stream and second code stream, a next code stream is not input. As a result, remaining code streams are not reproduced. Step 908 shows that a second code stream is input. Step 909 shows that a second code stream is decoded. Step 910 shows that a first and second image data are synthesized. Step 911 shows that an image data generated by Step 910 is displayed.

FIG. 47 is a flow diagram for explaining the processing of a plurality of pages. Step 1001 shows that a client designates a code data that stored in a server. Step 1002 shows that a client requests the code data that was designated by Step 1001 to the server. Step 1003 shows that user designates a mode whether it is displayed progressively or not. Step 1004 shows that a server selects an object of a code data that was designated by Step 1003. Step 1005 shows that a server generates a code stream from the designated code data and transfers the code stream to a client. Step 1006 shows that a client reproduces a single object after decoding a code stream. Step 1007 shows that a client requests a code data of a partial image data to a server. Step 1008 shows that user designates a mode whether it is displayed progressively or not. Step 1009 shows that a server selects an object of a code data that was designated by Step 1008. Step 1010 shows that a server generates a code stream from the designated code data and transfers the code stream to a client. Step 1011 shows that a client reproduces a multi object after decoding a code stream. Thus, a plurality of image data are decoded first, and an object of each image data in each page is selected. A user designates a code data, after user confirmed the image data of plural pages. An object of a partial code data excludes designated code data is transferred from a client to a server. In addition, the partial code data is decoded. Finally, an image data of the designated page is displayed in detail.

Moreover, the embodiments of the invention may be embodied as a computer program which comprises instructions which, when executed by a processing device in the client or server, causes the client or server to perform a method in accordance with the invention as described above. Such instructions may be tangibly embodied in the memory of the client or server, or alternatively, they may be tangibly embodied in another memory, such as semiconductor memory, or on a separate storage device such as an optical or magnetic medium (e.g., computer readable storage mediums). Likewise, the instructions may be tangibly embodied on a propagating signal (e.g. a signal propagated during uploading, downloading, messaging or other kinds of transfer between elements of a computer network such as the Internet or through a wireless communication network).

Obviously, numerous modifications and variations of the present invention are possible in light of the above teachings. It is therefore to be understood that within the scope of the appended claims, the invention may be practiced otherwise than as specifically described herein.

What is claimed is:

1. A system comprising:
    a client including
        a requesting unit configured to request a code data stored in the server,
        a first receiving unit configured to receive the code data from the server,
        a decoding unit configured to decode the code data which is received from the server, and
        a display unit configured to display an image data which is generated by the decoding unit; and
    a server including
        a second receiving unit configured to receive the request from a client,
        a selecting unit configured to select the code data which is requested from the client,
        a transferring unit configured to transfer the code data which is selected by the selecting unit,
        wherein the code data is a part of at least code data of JPM (JPEG2000 Multi Layer) file; and
        a calculating unit configured to calculate a ratio of character area to picture area in the code data of each object,
        wherein the server uses the ratio to set a priority order of transferring the objects in the code data to the client.

2. The system as claimed in claim 1,
    wherein the server is configured to transfer a remaining object of the code data that is requested from the client after transferring an object that includes the code data which is requested from the client.

3. The system as claimed in claim 1,
wherein the server is configured to transfer all objects that include the code data which is requested from the client sequentially, and
the client is configured to decode the code data which is received from the server and to display an image data which is generated by decoding.

4. The system as claimed in claim 1,
wherein the client is configured to transfer an interrupt signal to the server, and
the server is configured to stop transferring the objects when the server receives the interrupt signal from the client.

5. A method comprising:
requesting a code data stored in a server;
receiving the request from a client;
receiving the code data from the server;
a selecting the code data which is requested from the client, said code data including plural objects, and said code data is a part of at least code data of JPM (JPEG2000 Multi Layer) file;
calculating a ratio of character area to picture area in the code data of each object;
setting a priority order of transferring the objects in the code data to the client;
transferring the code data which is selected by the selecting, wherein the objects in the code data are transferred according to the priority order;
decoding the code data which is received from the server; and
displaying an image data which is generated by the decoding.

6. The method as claimed in claim 5, further comprising:
transferring a remaining object of the code data that is requested from the client after transferring an object that includes a code data which is requested from the client.

7. The method as claimed in claim 5, further comprising:
transferring all objects that include the code data which is requested from the client sequentially.

8. The method as claimed in claim 5, further comprising:
transferring an interrupt signal to the server; and
stopping a transferring of the objects when the server receives the interrupt signal from the client.

9. A non-transitory computer readable storage medium, encoded with instructions, which when executed by a system of a client and a server causes the system to implement a method comprising:
requesting a code data stored in the server;
receiving the request from the client;
receiving the code data from the server;
a selecting the code data which is requested from the client, said code data including plural objects, and said code data is a part of at least code data of JPM (JPEG2000 Multi Layer) file;
calculating a ratio of character area to picture area in the code data of each object;
setting a priority order of transferring the objects in the code data to the client;
transferring the code data which is selected by the selecting, wherein the objects in the code data are transferred according to the priority order;
decoding the code data which is received from the server; and
displaying an image data which is generated by the decoding.

* * * * *